(12) United States Patent
McCollum et al.

(10) Patent No.: US 7,712,085 B2
(45) Date of Patent: *May 4, 2010

(54) USE OF ATTRIBUTION TO DESCRIBE MANAGEMENT INFORMATION

(75) Inventors: Raymond W McCollum, Redmond, WA (US); Corina E Feuerstein, Redmond, WA (US); Mario Hewardt, Bellevue, WA (US); Brian Reistad, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 993 days.

This patent is subject to a terminal disclaimer.

(21) Appl. No.: 10/943,452

(22) Filed: Sep. 17, 2004

(65) Prior Publication Data

US 2005/0091647 A1    Apr. 28, 2005

Related U.S. Application Data

(63) Continuation of application No. 10/692,432, filed on Oct. 23, 2003.

(51) Int. Cl.
G06F 9/44 (2006.01)
G06F 9/445 (2006.01)
G06F 9/46 (2006.01)

(52) U.S. Cl. .................. 717/130; 717/127; 717/174; 719/328

(58) Field of Classification Search .............. None
See application file for complete search history.

(56) References Cited

U.S. PATENT DOCUMENTS

| | | | |
|---|---|---|---|
| 5,732,234 A | 3/1998 | Vassiliadis et al. | |
| 5,878,418 A * | 3/1999 | Polcyn et al. | 707/10 |
| 5,920,873 A | 7/1999 | Van Huben et al. | |
| 6,012,152 A | 1/2000 | Douik et al. | |
| 6,067,548 A | 5/2000 | Cheng | |
| 6,085,030 A | 7/2000 | Whitehead et al. | |
| 6,088,451 A | 7/2000 | He | |
| 6,138,168 A | 10/2000 | Kelly et al. | |
| 6,212,581 B1 | 4/2001 | Graf | |
| 6,219,666 B1 | 4/2001 | Krishnaswamy et al. | |
| 6,473,895 B1 | 10/2002 | Lopes | |

(Continued)

OTHER PUBLICATIONS

"A service-oriented monitoring registry", Kakali et al., Oct. 2003, pp. 107-121, <http://delivery.acm.org/10.1145/970000/961340/p107-kalali.pdf>.*

(Continued)

*Primary Examiner*—Tuan Q Dam
*Assistant Examiner*—Thuy Dao
(74) *Attorney, Agent, or Firm*—Workman Nydegger

(57) ABSTRACT

Architecture that facilitates management of an application or service of a system. A catalog is provided that stores management information which is accessible to determine the status of the application of service. Code of the application or service to be installed on the system is attributed with management information. When installed, the application or service is processed to copy the management information into a manifest, which manifest is further stored in the catalog along with other manifests associated with different applications or services. The management information in a manifest is uniquely identified by a URI, which access to the management information is via the URI, and which leads to the associated application or service.

19 Claims, 15 Drawing Sheets

U.S. PATENT DOCUMENTS

| | | | |
|---|---|---|---|
| 6,477,572 | B1 | 11/2002 | Elderton et al. |
| 6,553,387 | B1 | 4/2003 | Cabrera et al. |
| 6,598,060 | B2 | 7/2003 | Goldick |
| 6,635,088 | B1 | 10/2003 | Hind et al. |
| 6,678,889 | B1 * | 1/2004 | Burkett et al. ............... 718/104 |
| 6,684,231 | B1 | 1/2004 | Cabrera et al. |
| 6,754,664 | B1 | 6/2004 | Bush |
| 6,865,593 | B1 | 3/2005 | Reshef et al. |
| 6,871,344 | B2 * | 3/2005 | Grier et al. .................. 717/162 |
| 7,266,814 | B2 | 9/2007 | Bosworth et al. |
| 7,287,247 | B2 | 10/2007 | Gschwind et al. |
| 2002/0019870 | A1 | 2/2002 | Chirashnya et al. |
| 2002/0029374 | A1 * | 3/2002 | Moore ........................... 717/1 |
| 2002/0049715 | A1 | 4/2002 | Serrano-Morales et al. |
| 2002/0059425 | A1 | 5/2002 | Belfiore et al. |
| 2002/0133535 | A1 | 9/2002 | Lucovsky et al. |
| 2002/0147726 | A1 | 10/2002 | Yehia et al. |
| 2002/0174125 | A1 | 11/2002 | Lucovsky et al. |
| 2003/0131343 | A1 | 7/2003 | French |
| 2003/0135628 | A1 | 7/2003 | Fletcher et al. |
| 2003/0143509 | A1 | 7/2003 | Kopelman et al. |
| 2003/0145309 | A1 | 7/2003 | Inamdar |
| 2003/0177109 | A1 | 9/2003 | Cabrera et al. |
| 2003/0220993 | A1 * | 11/2003 | Blizniak et al. ............. 709/223 |
| 2004/0010716 | A1 | 1/2004 | Childress |
| 2004/0031038 | A1 | 2/2004 | Hugly et al. |
| 2004/0034853 | A1 | 2/2004 | Gibbons et al. |
| 2004/0068720 | A1 * | 4/2004 | Hundt ........................ 717/158 |
| 2004/0083454 | A1 | 4/2004 | Bigues et al. |
| 2004/0111638 | A1 | 6/2004 | Yadav et al. |
| 2004/0133656 | A1 * | 7/2004 | Butterworth et al. ........ 709/219 |
| 2004/0181541 | A1 | 9/2004 | Groenendaal et al. |
| 2004/0260819 | A1 | 12/2004 | Trossen |
| 2005/0021530 | A1 * | 1/2005 | Garg et al. .................. 707/100 |
| 2005/0097146 | A1 | 5/2005 | Konstantinou et al. |
| 2005/0172306 | A1 | 8/2005 | Agarwal et al. |

OTHER PUBLICATIONS

"Performance monitoring of java applications", Harkema et al., Jul. 2002, pp. 114-127, <http://delivery.acm.org/10.1145/590000/584388/p114-harkema.pdf>.*

"Web application security assessment by fault injection and behavior monitoring", Huang et al., May 2003, pp. 148-159, <http://delivery.acm.org/10.1145/780000/775174/p148-huang.pdf>.*

International Search Report dated Oct. 14, 2005 mailed Dec. 2, 2005 for PCT Application Serial No. PCT/US04/22378, 6 pages.

International Search Report dated Feb. 15, 2005 mailed Mar. 4, 2005 for PCT Application Serial No. PCT/US04/22275, 5 pages.

Hewlett-Packard, Event Correlation Services Designer Overview & Features, viewed at http://www.openview.hp.com/products/ovocd/index.html, 1994-2003, 2 pages.

Hewlett-Packard, Event Correlation Services Designer's Guide, HP OpenView, pp. 1-236, Sep. 1998.

IBM Corporation, Rule Builder's Guide, Version 3.8, pp. 1-450, 2002.

Computer Associates International, Inc., Using the Performance Neugent Guide, 1999-2000, 99 pages.

Computer Associates International, Inc., Working with Neugents Guide, 1999, 35 pages.

F. Manola et al., RDF Primer W3C Working Draft Oct. 10, 2003. W3C, pp. 1-119.

J. Kunze, Functional Recommendations for Internet Resource Locators, http://www.icrf.org/rfc/rfc1736.txt, Feb. 1995. 10 pages.

K. Sollins, Functional Requirements for Uniform Resource Names, http://www.icrf.org/rfc/rfc1736.txt, Dec. 1994, 7 pages.

T. Berners-Lee, et al., Uniform Resource Identifiers (URI): Generic Syntax, Network Working Group, Aug. 1998. pp. 1-38.

Along Lin, A New Model-Based Automated Diagnosis Algorithm, Feb. 1998, pp. 1-6.

Binoy Ravindran, Engineering Dynamic Real-Time Distributed Systems: Architecture, System Description Language, and Middleware, IEEE Transactions on Software Engineering, Jan. 2002, pp. 30-57, vol. 28, No. 1.

Timothy Roscoe, et al., InfoSpect Using a Logic Language for System Health Monitoring in Distributed Systems, Proceedings of the SIGOPS European Workshop, Sep. 2002, pp. 1-7, Saint-Emilion, France.

F. Steimann, et al., Modela Based Diagnosis for Open Systems Fault Management, AI Communications, 1999.

Vijayan Sugumaran, et al., A Semantic-Based Approach to Component Retrieval, The Data Base for Advances in Information Systems, pp. 8-24, Summer 2003, vol. 34, No. 3.

ABLE: A Toolkit for building multiagent autonomic systems IBM Systems Journal vol. 41, No. 3, 2002 pp. 350-371.

International Search Report dated Jul. 3, 2008 for PCT Application Serial No. PCT/US04/24134, 2 Pages.

Office Action dated May 16, 2008 cited in U.S. Appl. No. 10/693,072.

Notice of Allowance dated Jan. 16, 2009 cited in U.S. Appl. No. 10/693,072.

Office Action dated Feb. 21, 2008 cited in U.S. Appl. No. 10/693,588.

Office Action dated Jul. 29, 2008 cited in U.S. Appl. No. 10/693,588.

Office Action dated Jul. 27, 2009 cited in U.S. Appl. No. 10/693,588.

Office Action dated Oct. 10, 2007 cited in U.S. Appl. No. 10/692,432.

Office Action dated May 2, 2008 cited in U.S. Appl. No. 10/692,432.

Office Action dated Apr. 6, 2009 cited in U.S. Appl. No. 10/692,432.

* cited by examiner

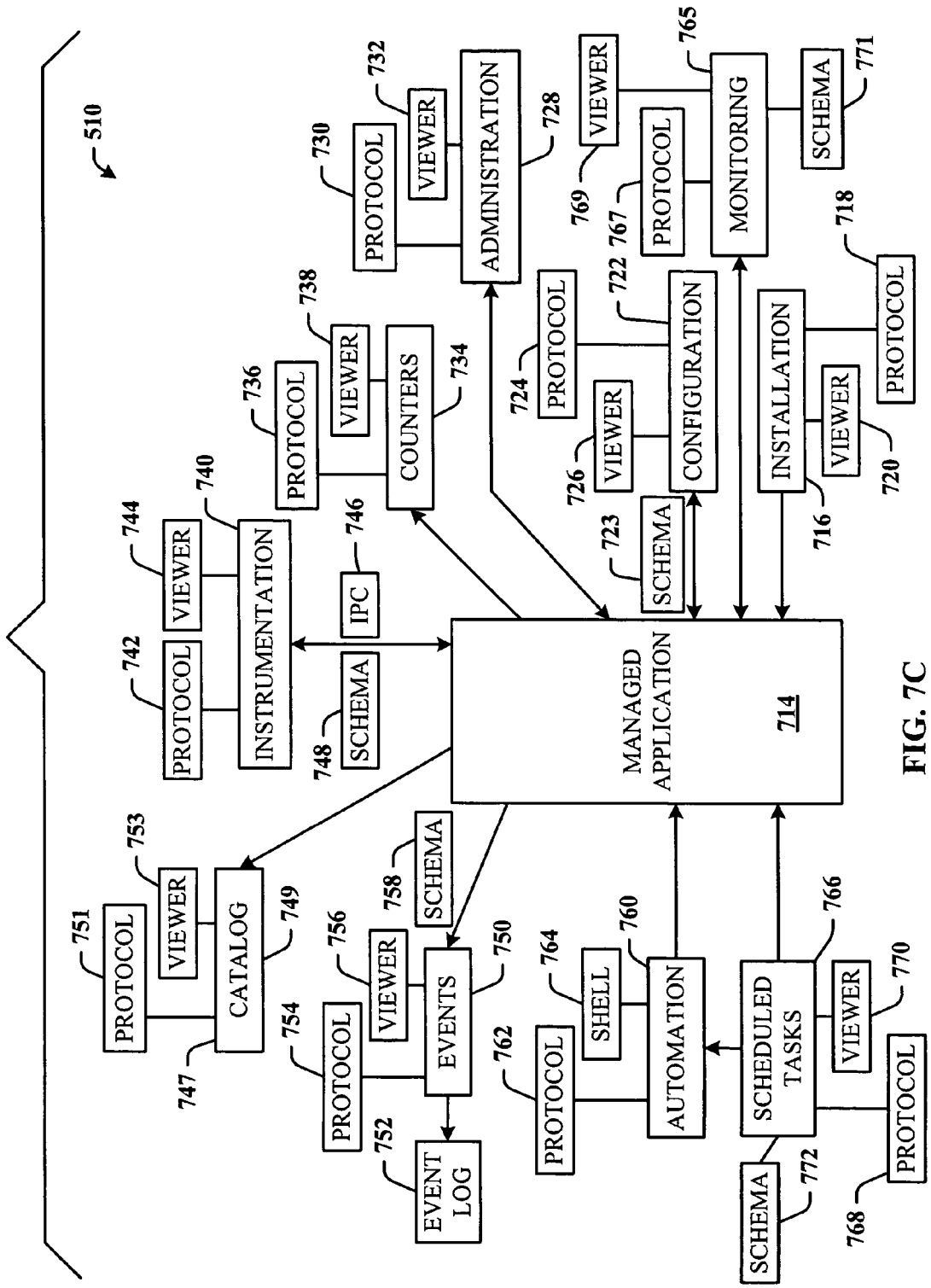

USE OF ATTRIBUTION TO DESCRIBE MANAGEMENT INFORMATION

CROSS-REFERENCE TO RELATED APPLICATIONS

This application is a continuation of pending U.S. patent application Ser. No. 10/692,432 entitled "USE OF ATTRIBUTION TO DESCRIBE MANAGEMENT INFORMATION" and filed on Oct. 23, 2003, and is related to the following pending applications: U.S. patent application Ser. No. 10/693,588 entitled "USING URI'S TO IDENTIFY MULTIPLE INSTANCES WITH A COMMON SCHEMA" and filed on Oct. 24, 2003, and U.S. patent application Ser. No. 10/917,074 entitled "COMPUTER SYSTEM INSTRUMENTATION INFORMATION" filed on Aug. 12, 2004, which claims the benefit of U.S. Provisional Patent Application Ser. No. 60/537,637 entitled "SYSTEM PROTOCOL FOR USING URI FOR COMPUTER MANAGEMENT" and filed on Jan. 20, 2004. The entirety of the above-noted applications are incorporated by reference herein.

TECHNICAL FIELD

This invention is related to a system that manages applications, and more specifically, to software architecture that exposes the applications to the system for management.

BACKGROUND OF THE INVENTION

Traditional systems management is largely ad-hoc. Application developers do not have a structured framework for managing their applications and achieving high reliability. Developers normally have to write and maintain two separate pieces of code-one for normal application processing and a second one to expose it to management. For example, in one conventional architecture, management is part of the specification and a component cannot be compiled without exposing some management properties What is needed is an improved architecture for exposing an application to facilitate system management.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The present invention disclosed and claimed herein, in one aspect thereof, comprises the use of attribution to express management information in an application or service. Attribution is used to describe which parts of the application or service code should be used to determine and/or correct health (referred to as a "probe"), as well as to specify when to execute rules monitoring such aspects. Attribution allows the developer to avoid writing and maintaining two separate pieces of code-one for normal application processing and a second one to expose it to management. With attribution, the second body of code and the associated maintenance and consistency issues are substantially eliminated making it much easier for developers to participate in management.

The attribution is employed in a model-based management architecture that provides a framework to enable a developer to describe an application or service in terms of its components.

To the accomplishment of the foregoing and related ends, certain illustrative aspects of the invention are described herein in connection with the following description and the annexed drawings. These aspects are indicative, however, of but a few of the various ways in which the principles of the invention may be employed and the present invention is intended to include all such aspects and their equivalents. Other advantages and novel features of the invention may become apparent from the following detailed description of the invention when considered in conjunction with the drawings.

BRIEF DESCRIPTION OF THE DRAWINGS

FIG. 7C illustrates a block diagram of core system APIs of the system component utilized for managing an application or service in accordance with the model-based management architecture.

DETAILED DESCRIPTION OF THE INVENTION

Figure 1:
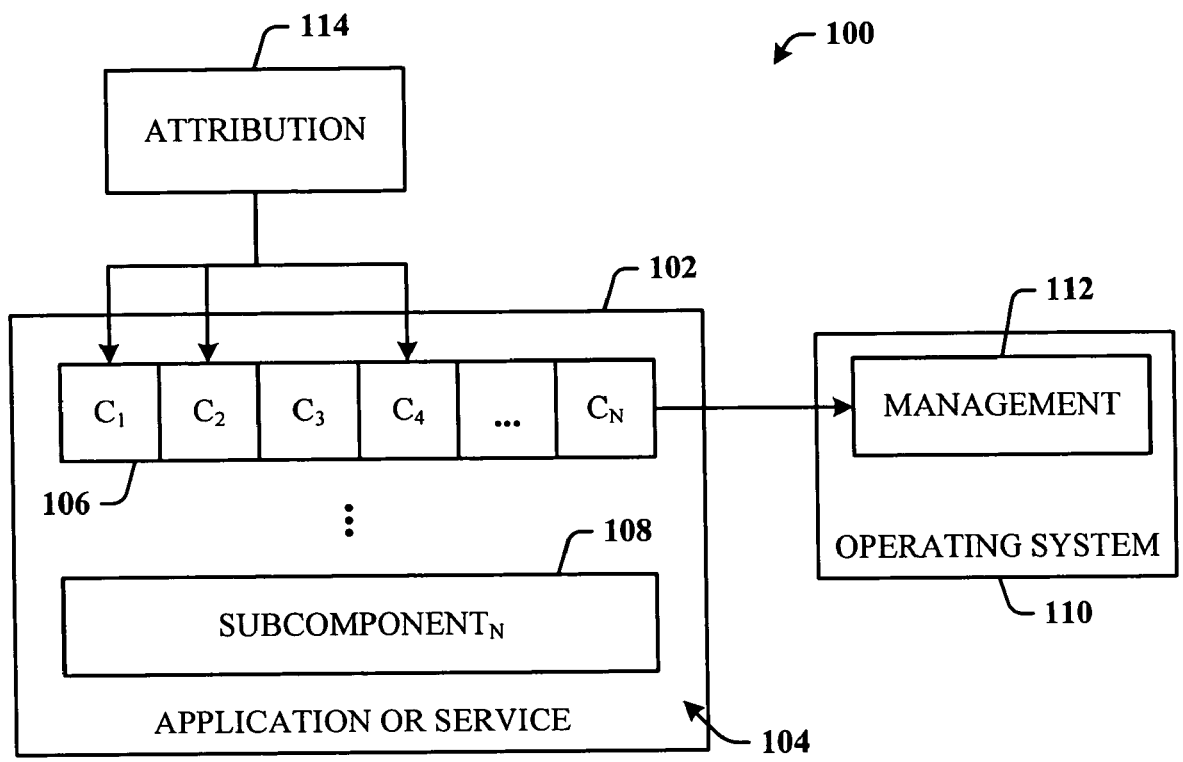
FIG. 1 illustrates a block diagram of an attribution architecture of the present invention.

The present invention is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

As used in this application, the terms "component" and "system" are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

As used herein, the term "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic-that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Referring now to FIG. 1, there is illustrated a block diagram of an attribution architecture of the present invention. There is provided an application program or service 102 for installation on a computer, the application or service 102 (hereinafter referred to only as an application, but is intended to include at least an application or a service) including one or more code subcomponents 104 (a first code subcomponent 106 to an Nth code subcomponent 108 (also denoted SUB-COMPONENT$_N$). The computer includes an operating system (OS) 110 to facilitate master control of all hardware and software aspects of the computer. Once installed, the application 102 communicates with the OS 110 for all user interface and file management operations.

The OS 110 includes a management component 112 implemented in accordance with the model-based management framework described hereinbelow, from which to manage one or more of the applications 102 installed thereon. Note that although the application 102 is illustrated as a block separate from the OS 110, the application 102 can be manufactured as an integral part of the OS 110 such that it is installed with the OS 110, or the application 102 is considered part of the OS 108, but yet is installed separately from the OS installation. Further, the application or service 102 can be installed at a remote location, for example, on a remote computer in communication with the management component 112, which resides on a local computer.

The code subcomponents 104 are each comprised of code parts. For example, the first code subcomponent 106 includes code parts ($C_1$, $C_2$, $C_3$, $C_4$, . . . , $C_N$), denoted as such for purposes of describing attribution in the context of the present invention. The code parts ($C_1$, $C_2$, $C_3$, $C_4$, . . . , $C_N$) can be separate, as indicated by the code blocks; however, the first subcomponent 106 can also be one contiguous block of code.

There is also provided an attribution component 114 that facilitates allowing the developer to add attribution to selected code parts. Here, attribution is applied to code parts $C_1$, $C_2$, and $C_4$ of the first code subcomponent 106, which attributed parts may be considered probes for use in determining the health of the associated first subcomponent 106 and the application 102.

Attribution allows the developer to publish probes for management purposes from the original code with minimal additional code. Probes can be exposed from components that access existing OS application program interfaces (APIs) (the existing OS APIs called in-process providers) or from components loaded inside running applications or services (called decoupled providers). In both cases, the developer adds attribution to indicate what subset of the types within the components should be exposed and how the type subsets should be identified.

Probes are identified using URIs (Uniform Resource Identifiers) within an administrator namespace. These URIs may be different than the internal development names for the component. Probes can identify instances of a type, and this is captured within the probe by using a place holder (such as '_') to indicate where the instance identity must be supplied. In the decoupled case, the developer also adds a register call and an unregister call, on startup and shutdown, to notify the system that it is available to answer probes. Beyond this, there is no additional work on the part of the developer to deal with inter-process communication.

Figure 2:
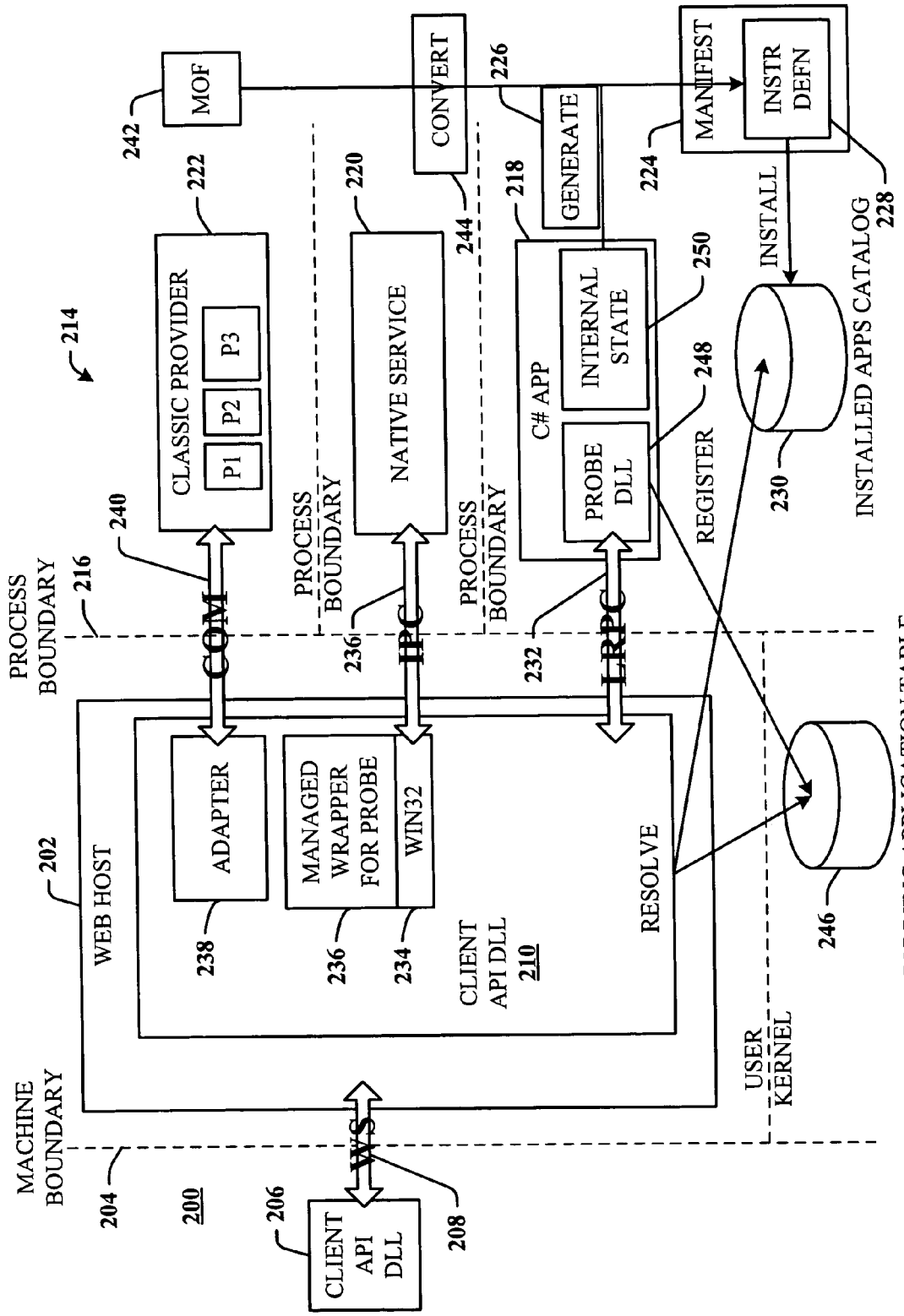
FIG. 2 illustrates a more detailed block diagram of the use of attribution in a system implemented in accordance with the present invention.

Referring now to FIG. 2, there is illustrated a more detailed block diagram of the use of attribution in a system implemented in accordance with the present invention. There is provided a client 200 and a web host 202 demarcated by a machine boundary 204. The client 200 includes a software client API DLL (Dynamic Link Library) 206, which is an executable program module that facilitates communication 208 (e.g., web services, denoted as WS) with the web host 202. The web host 202 includes a host client API DLL 210 that facilitates communication with a number of resident processes 214 (also called providers). The host client API 210 can interface to the respective providers 214 in a number of ways, which provider processes 214 are demarcated from the web host 202 by a demarcation line 216. The separate host providers 214 include a programming language application provider 218 (e.g., C#), a native service provider 220, and a classic provider 222. Note, however, that the application provider 218 can be any suitable programming application.

The description includes both an authoring phase and a runtime phase. During the authoring phase, an application or service provider is prepared (or authored) by attribution of the management information for use during the runtime phase. The application or service is authored using the application 218. The application 218 applies type information to the code according to predetermined criteria used to stipulate which areas of the code are deemed to be important for determining the health of the application. A software tool is then applied to the attributed code that sweeps the code for all attributed information and generates an instrumentation manifest 224 for that application, as indicated by a generate process 226.

The instrumentation manifest 224 includes probe definitions 228. The manifest 224 is then installed into an installed applications catalog 230 that includes a collection (or catalog) of instrumentation manifests generated for the various applications and services that are installed on the host system 202. Programs interested in the health information and accessing the host 202, e.g., the client DLL 206, can further access the linking process 230 through the host client DLL 210 to obtain the instrumentation definitions 228 of all applications installed on the host system 202.

At runtime, the client DLL 206 (or consumer of health information) that wants to determine something about the health of one or more applications accesses the web host 202 using the connection protocol 208 to access the web host client DLL 210, which in turn communicates with the application 218 via a Local RPC (Local Remote Procedure Call) channel 232. The host client DLL 210 retrieves the health information and returns it to the client 206.

There are several different provider scenarios that can be addressed, which include the application provider 218 that was just described, the native service provider 220, and the classic provider 222. The native service 220 is written in unmanaged code (or native code). Thus, managed code needs to be "wrapped" around the native code such that the native service 220 can be suitable for management in accordance with the present invention. The native service 220 communicates with the host DLL 210 using WIN32 calls 234 over an IPC (InterProcess Communication) link 236. In this case, the health information of the native service 220 is instrumented by attributing the managed code wrapper 236 facilitating communication of the health information to the client 206.

It is to be appreciated that there can be the classic provider 222 where attribution cannot be obtained in accordance with the present invention. Here, the type of data that already describes the health of that provider 222 or of one or more internal processes P1, P2, and P3, is available to the host client DLL 210 via an adapter 238. The adapter 238 facilitates communication to the classic provider 222 via a COM (Common Object Model) link 240. The health information of the classic provider 222 is provided via a file formatting process 242 (e.g., managed object format (MOF)) that is converted into an instrumentation manifest according to a convert process 244. Thus, there is no need to attribute the code and develop a manifest in accordance with the present invention. Extensions of the MOF definitions can be added to allow customization of the MOF to conversion of the instrumentation manifest.

A running application table 246 is provided with a table of ports that maps to applications of the host system 202, such that a consumer of health information can access the table 246 and further access the desired application(s). When an application starts, registration is performed via dedicated registration API(s) implemented in a DLL 248, and from any part of the application 218. It registers with the table 246 such that by accessing the table 246, at any given time, it is known what instrumented applications are running on the system.

The application 218 also includes an internal state component 250 that is whatever health information that the application has to provide, e.g., statistics about successes or failures. The internal state data 250 is the data used to generate the instrumentation manifest 224 via the generation process 226. Note that attribution can also include operations that are to be performed and runtime states that can be configured, in addition to the health data. The managed wrapper 236 used for the native service 220 can be managed-code classes used to make WIN32 calls 234 in its implementation.

Figure 3:
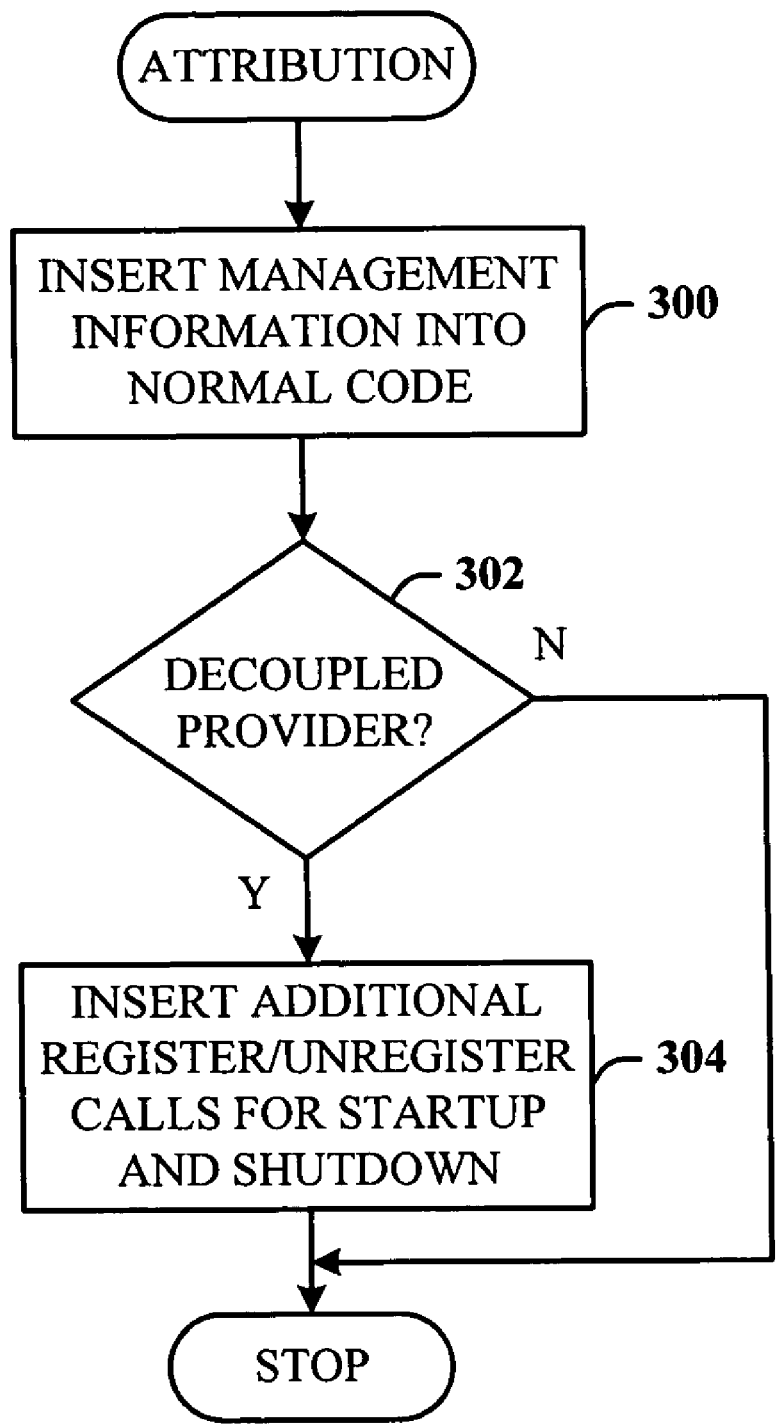
FIG. 3 illustrates a flow chart of the attribution process, in accordance with the present invention.

Referring now to FIG. 3, there is illustrated a flow chart of the attribution process, in accordance with the present invention. While, for purposes of simplicity of explanation, the one or more methodologies shown herein, e.g., in the form of a flow chart, are shown and described as a series of acts, it is to be understood and appreciated that the present invention is not limited by the order of acts, as some acts may, in accordance with the present invention, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the present invention.

At 300, management information is inserted into the code in the form of attributes at selected code parts. The management information is used to identify which parts of the code of the application or service will be used to determine and/or correct health, as well as to specify when to execute rules for monitoring the management information. At 302, it is determined if the process is a decoupled provider. If YES, flow is to 304 to insert additional management information. In the decoupled case, the developer must also add respectively a register call and an unregister call, on startup and shutdown, to notify the system that it is available to answer probes. Beyond this, there is no additional work on the part of the developer to deal with inter-process communication. The process then reaches a Stop block. If it is determined that the provider is not a decoupled provider, flow is from 302 to the STOP block. In both the in-process case and the decoupled case, the developer adds attribution to indicate what subset of the types within their components should be exposed and how the type subsets should be identified.

Figure 4:
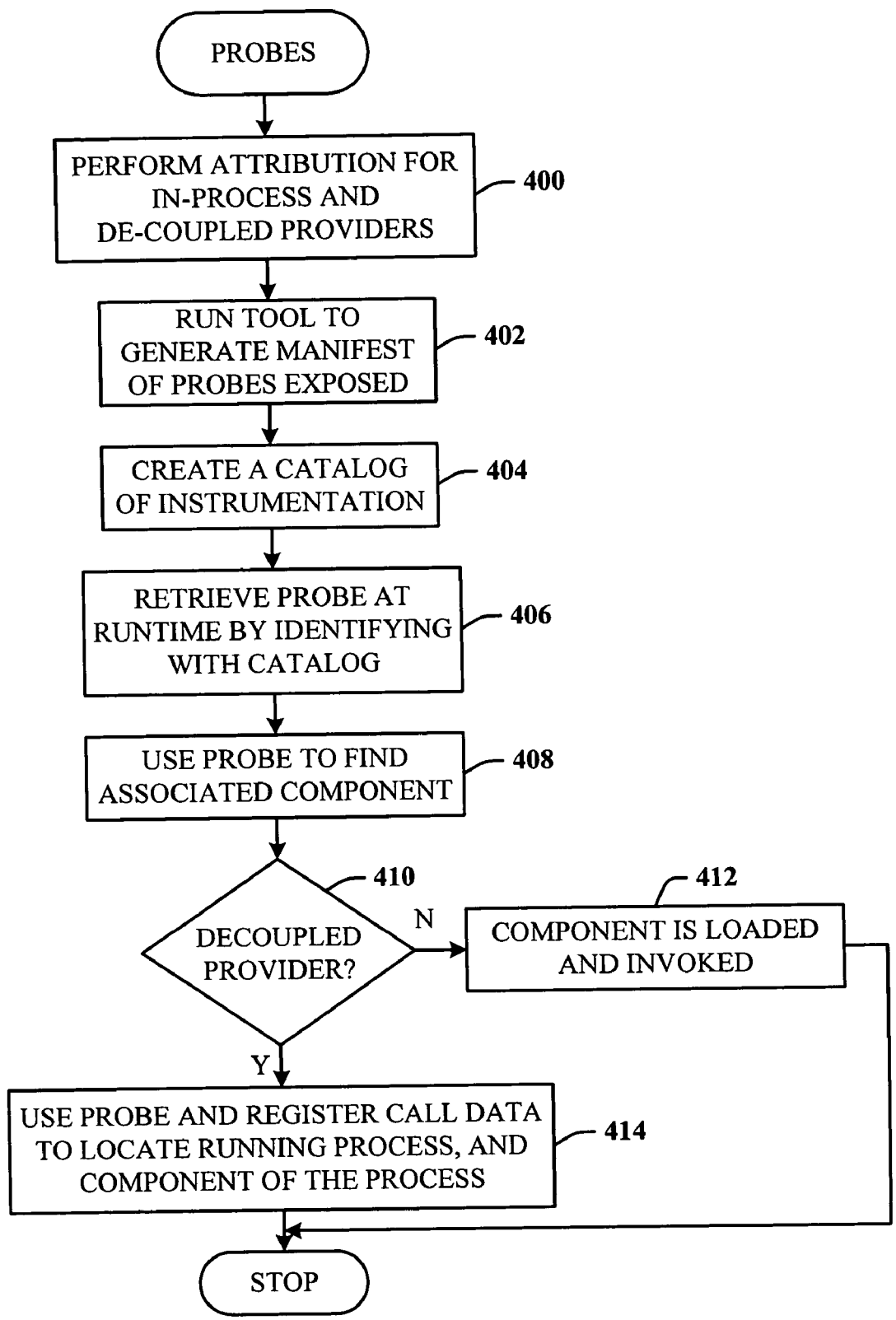
FIG. 4 illustrates a flow chart of the process of exposing probes developed via attribution, in accordance with the present invention.

Referring now to FIG. 4, there is illustrated a flow chart of the process of exposing probes developed via attribution, in accordance with the present invention. At 400, attribution is performed for both in-process and decoupled providers. At 402, a tool is run over the attributed component(s) to generate a manifest of the probes that are desired to be exposed to the management system. There is also provided a validation mode where the tool compares attribution in the component with an existing manifest and reports any differences, and/or merges the manifests in an update process. At 404, a catalog is created of all probes from the manifests of all components on the computer, the catalog includes all available instrumentation which the administrator can browse and discover particular instrumentation points. At runtime, a probe is retrieved by identifying it within the catalog of all probes on the machine, as indicated at 406. At 408, the probe is used to find associated information that was collected during manifest generation. The associated information is then followed.

At 410, it is determined if the provider is a decoupled provider. If NO, the provider is an in-process provider, and flow is to 412 where the associated component is loaded (whether in the current process or a separate host process for isolation purposes) and called or invoked. Flow is then to a Stop block. If a decoupled provider, flow is from 410 to 414 where the probe is used in conjunction with the information provided by the running application table as a result of an application calling register to locate the running process and, connect and locate the component within the running process. Flow is then to the Stop block.

For example, the following class exposes a registry key as an in-process provider:

```
namespace MyNamespace
{
    [Folder(Uri="#System/RegKey")]
    public class RegKey
    {
        [Probe(Uri="/name=__")]
        public static String GetKey(String name)
        {
            return (String)
    Registry.CurrentUser.OpenSubKey("MyApp").GetValue ( name ) ;
        }
    }
}
``` which exposes one URI: #System/RegKey/name=__

Attribution and Instrumentation

Attribution, in general, is the process of adding metadata to code. Using attribution for management lowers the barrier for making a system manageable by minimizing the work involved in enabling an application for management. A namespace also makes it easy to expose events and data, and use relationships between management objects.

Instrumentation is a technique whereby a developer can surface or expose information that is consumable by the administrator and managing an application. When the application has been instrumented, objects and events can be discovered, monitored, and configured from diverse data sources. The source of the information might be a piece of hardware, operating system, or software application. The information provided by the data source is known as instrumentation. The purpose of instrumentation is very similar to the purpose served by the instrument panel of a car dashboard. Car instrumentation includes gauges, lights and indicators that allow for monitoring information about various components (such as the fuel gauge) when various events occur (such as the open door alarm). All this instrumentation allows decisions to be made on how the car is driven and maintained. Computer components that provided instrumentation allow management software to diagnose and correct problems in an enterprise computing environment.

Other instrumentation technologies exist, such as tracing or log files, restrict applications to providing a raw block of unstructured diagnostic information (such as a simple string). To facilitate exposing application or service information, a set of classes are used that describe the information that they will provide through instrumentation. These class definitions are published, and are accessible to management tools. The class definitions are available at any time after the application is installed, and not just when the application is running. At run time, the application provides the actual data described by the classes. The concept of class definitions is at the heart of programming in managed code. The disclosed architecture uses XML schemas (e.g., XML Schema Definition (XSD)) to represent the metadata about the diagnostic information. In the attribution scenario, the programming class is converted into an XSD.

Application information for management is mostly exposed by making declarations—no extensive extra coding is required. The developer marks the objects as manageable by using the attribution capabilities and defines how the objects map into the management schema.

Developing Instrumentation Using Attribution

Attribution of types allow for a very convenient way of adding additional semantics to that particular type. Following is a disclosed attribution scheme.

Folder Attribute: The developer uses the Folder attribute to specify that the type is instrumented. This attribute is required on all types that are instrumented. Types that can be instrumented are Classes and Structures (i.e., value types).

Folder Attribute and Default URIs: The default URI for a Probe type is defined by using namespace hierarchy where the type is defined. If an explicit URI has been set via the Folder attribute, it must be a full URI, since can override the namespace hierarchy.

Folder Attribute and Custom URIs: It is possible to override the default URI naming mechanism by setting the URI property in the Folder attribute declaration. It is possible to specify an empty string as the folder URI, in which case the member URI(s) are moved up one level. Following is a process probe with no folder URI specified.

```
namespace System.Diagnostics
{
    [Folder(Uri="")]
    public class Process
    {
        [Probe(Uri="ProcessId=_")]
        public Process ( int pid ) { }
        [Probe(Uri="ProcessId", NavigationTypes.EndPoint)]
        public int Id { get { ; } }
        [Probe(Uri="ProcessName", NavigationTypes.EndPoint)]
        public string Name { get { ; } }
    }
}
```

Folder Attribute and Member Separators: By default, URI fragments are separated by the '/' to form the complete URI. #System/OS/Windows/Process/ProcessId=0

The standard separator can be overridden at the type level by setting the Separator property in the Folder attribute declaration.

Probe Attribute: The developer uses the Probe attribute to indicate that a member of a type (decorated with the Folder attribute) is a Probe.

Probe Attribute and Default URIs: By default, the parameter-less version of the attribute uses a member name to which the attribute is defined as the URI fragment. Following is a sample defaulted type locator URI for the process class.

```
namespace System.Diagnostics
{
    [Folder]
    public class Process
    {
        [Probe]
        public Process ( int pid ) { }
    }
}
```

The URI(s) for the Probe type is:
System/Diagnostics/Process/pid=_

The following table shows which members are valid instrumentation members, as well as the default naming for each.

| Member Type | Default Uri |
| --- | --- |
| Field | <FieldName> |
| Property | Get method: <PropertyName>, Set method: <PropertyName>=_ |
| Method | <MethodName>(<parameterName>=_, <parameterName>=_,...) |
| * Constructor | <parameterName>=_, <parameterName>=_,... |

* Note that even though a constructor is a method, the default URI generation is special cased to provide more logical URI(s).

A more complete example of how to default URI(s) on a Probe type is the following:

```
namespace System.Diagnostics
{
    [Folder]
    public class Process
    {
        [Probe]
        public Process ( int pid ) { }
        [Probe]
        public int Id { get { ; } }
    }
}
```

In this case, the following URI(s) are automatically generated:
System/Diagnostics/Process/pid=_
System/Diagnostics/Process/pid=_/Id Probe Attribute and Custom URIs: It is possible to override the default URI naming mechanism by using an overloaded form of the Probe attribute that takes a string that specifies the URI. Note that the URI(s) specified at the member level are relative to the URI at the type level.

Probe Attribute and Types/Navigation: The Probe attribute provides two properties that allow the developer to specify how that URI fragment should be interpreted. The NavigationTypes enumeration provides the following options: EndPoint and Navigational.

Depending on the characteristics of the member that is decorated the developer can either rely on the default setting or choose from one of the above. The default settings depend on the return type of member to which the attribute is applied.

| Return Type | Default Setting |
| --- | --- |
| Primitive | EndPoint |
| Complex | Navigation/EndPoint |

Types are considered primitive, if they fall into one of the following: a definition of primitive type, and a string reference. Complex types are non-primitive types. A more precise definition of the modes is given below.

If the URI results in the return of another class and this class in turn is instrumented, the mode of this URI fragment is navigational. The member merely facilitates moving from one level in the class hierarchy to another. A more complex version of the process class with navigational characteristics is provided below.

```
namespace System.Diagnostics
{
    [Folder(Uri="#System/OS/Windows/Process")]
    public class Process
    {
        [Probe(Uri="ProcessId=_")]
        public Process ( int pid ) { }
        [Probe(Uri="Threads")]
        public Thread[ ] Threads { get { return threads; } }
    }
    [Folder]
    public class Thread
    {
        internal Thread ( ) { }
        [Probe (Uri="ThreadId",
NavigationType=NavigationTypes.EndPoint )]
        public int Id { get { return id; } }
    }
}
```

The version above has been extended to include a property that returns all threads within a process, each thread being represented by the Thread class. Simply by attributing the Threads property with the Probe attribute, this property becomes a navigational aid from the Process class to the Thread class. Note that a navigation type is not specified, since the default is Navigation. Examining the following URI makes it clear how the Navigational feature works:
System/OS/Windows/Process/ProcessId=0/Threads/ThreadId=12

The type locator URI is #System/OS/Windows/Process and allows the infrastructure to locate the type associated with this URI. The /ProcessId=0 is mapped to constructor of the Process class (by matching it with ProcessId=_). 0 is passed into the constructor which acts as a navigational method (navigating to an instance of the process class). The /Threads is mapped to the public Threads Property whose getter is invoked and returns a collection of Thread instances. The /ThreadId is mapped to the public Id property of the Thread class and its getter is invoked for each instance in the collection Note that in the Thread class itself that the constructor is not marked with the Probe attribute. The reason is that the Thread constructor is marked internal and is only creatable by the Process class. By not exposing construction methods it can be avoided to define URI(s) to a type that is not directly accessible.

An endpoint indicates a member that simply returns a result, thereby indicating the end of the URI. In previous examples these are, for example, ProcessId and ThreadId properties.

In addition to the NavigationTypes enumeration, one more enumeration exists that allows the developer to specify how the URI fragment should be interpreted. The ProbeTypes enumeration defines the following members: Get, Set, and Method.

Depending on the characteristics of the member that is decorated the developer can either rely on the default setting or choose from one of the above. The default settings depend on the member to which the attribute is applied

| MemberInfo | Default Value |
| --- | --- |
| Method | Method |
| Property | Get or Set or both |
| Field | Get| Set |

ProbeTypes.Method: Indicates a method execution that has side affects (such as a Kill method on the Process class). ProbeTypes.Get: Indicates retrieval of value(s). By default fields and properties are getters. ProbeTypes.Set: Indicates setting of value(s). By default fields and properties are setters.

Probe Attribute and Results: An even more complicated scenario arises when the navigational member returns a more generic form of objects (such as the object type). This can occur if the member is implemented based on a generic interface definition. As an illustration of this, the Process class may have been implemented as below, where Process class implements a navigational member which returns a generic object collection.

```
namespace System.Diagnostics
{
    public interface ISomeInterface
    {
        object[ ] SomeMethod { get ; }
    }
    [Folder(Uri="#System/OS/Windows/Process")]
    public class Process : ISomeInterface
    {
        [Probe(Uri="ProcessId=_")]
    public Process ( int pid ) { }
        [Probe(Uri="Threads",NavigationType=NavigationTypes.
Navigational, ResultType=typeof(Thread))]
        public object[ ] SomeMethod { get { return (object [ ])
threads; } }
    }
    public class Thread
```

-continued

```
    {
        internal Thread ( ) { }
        [Probe (Uri="TreadId",
NavigationType=NavigationTypes.EndPoint )]
            public int Id { get { return id; } }
        }
    }
```

In situations like this, some more information is required in order to successfully navigate to the Thread class. More specifically, the developer will have to set the ResultType property in the Instrumentation attribute declaration which allows them to specify the type of objects that are contained in the collection or array.

It should be noted that Probe members can return primitive, as well as complex types. The schema of a return type for a Probe member will be stored in the manifest. Note that the schema for a return type includes all public members unless the public member is attributed with the Probe attribute and is a complex type in which case a link to the URI is returned instead. If a developer chooses to ignore members, they can do so via the XMLIgnore attribute.

The capability to reach classes via URI(s) provides a uniform way of accessing code, as well as an implementation independent URI structure. In order to provide the capability of retrieving objects based on URI syntax, the infrastructure has to know, in detail, the construction semantics/syntax of that Probe type. Instrumentation supports custom object creation (i.e., via a separate dedicated method) and also supports three of the main construction mechanisms.

There are essentially two main programming paradigms for object construction: construction via constructor; and construction via static methods. The code illustration behind this discussion will be a slimmed down version of the process class altered slightly to illustrate each of the programming models. Following is a sample of a process class that uses a constructor with one parameter as the object creation mechanism.

```
namespace System.Diagnostics
{
    [Folder (Uri="#System/OS/Windows/Process")]
    public class Process
    {
        [Probe (Uri="ProcessId=_")]
        public Process ( int pid ) { }
[Probe(Uri="ProcessId",NavigationType=NavigationTypes.Endpoint)]
        public int Id { get { ; } }
[Probe(Uri="ProcessName",NavigationType=NavigationTypes.EndPoint)]
        public string Name { get { ; } }
    }
}
```

The following sample URI to this object constructs a process object that represents the OS process with process id=0.
System/OS/Windows/Process/ProcessId=0

Another sample URI to this object constructs a process object that represents the OS process with process id=12 and then returns the ProcessName property.
System/OS/Windows/Process/ProcessId=0/ProcessName Following is an example of a slightly modified process class where the constructor takes two parameters.

```
namespace System.Diagnostics
{
    [Folder (Uri="#System/OS/Windows/Process")]
    public class Process
    {
        [Probe (Uri="ProcessId=_,ProcessName=_")]
        public Process (int pid,string pName )
        {
        }
        [Probe (Uri="ProcessId",
NavigationType=NavigationTypes.EndPoint)]
            public int Id { get { ; } }
        [Probe (Uri="ProcessName",
NavigationType=NavigationTypes.EndPoint)]
            public string Name { get { ; } }
    }
}
```

If a method takes multiple parameters, they must be specified in the correct order (i.e., they are regarded as positional parameters). From the code above, a URI that constructs a process object that represents the OS process with process id=12 and name svchost would look like following:
System/OS/Windows/Process/ProcessId=12, ProcessName=svchost A URI that constructs a process object that represents the OS process with process id=12 and name svchost and then returns the ProcessId property would look like following:
System/OS/Windows/Process/ProcessId=12, ProcessName=svchost/ProcessId A URI that constructs a process object that represents the OS process with process id=12 and name svchost and then returns the ProcessName property would look like following:
System/OS/Windows/Process/ProcessId=0, ProcessName=svchost/ProcessName Note that if the defaulted Probe attribute is used with a method that takes multiple parameters, the auto-generated URI would look like:
System/Diagnostics/Process/pid=_,pName=_

There may be cases where there are a fairly large number of constructors. As an illustration of this scenario, consider the Process class and redesign it to have one required identifier (Id) and there non-identifiers (username, password, machine which all default to current user and local machine). The code may look like following:

```
namespace System.Diagnostics
{
    [Folder (Uri="#System/OS/Windows/Process")]
    public class Process
    {
        [Probe (Uri="ProcessId=_")]
        public Process ( int pid )
        {
        }
        [Probe
(Uri="ProcessId=_,UserName=_,Password=_,Machine=_")]
        public Process ( int pid,
            string user,
            string password,
            string machine)
        {
        }
        [Probe (Uri="ProcessId=_,Machine=_")]
        public Process ( int pid,
            string machine)
        {
        }
        [Probe (Uri="UserName",
```

-continued

```
NavigationType=NavigationTypes.EndPoint)]
        public string UserName { get { ; } }
        [Probe (Uri="Machine",
NavigationType=NavigationTypes.EndPoint)]
        public string MachineName { get { ; } }
        [Probe (Uri="ProcessId",
NavigationType=NavigationTypes.EndPoint)]
        public int Id { get { ; } }
    }
}
```

The first constructor uses the process id as the parameter and assumes current user and local machine. The second constructor requires: process id, user name, password and machine name to be specified. The third constructor assumes current user and allows you to specify a machine name and pid.

In cases where there are a number of overloaded constructors, all relevant constructor parameters need to be attributed. Each constructor that should be used must is attributed with the Probe attribute. The following sample URI constructs a process object that represents the OS process with process id=12 using the first constructor.
System/OS/Windows/Process/ProcessId=12

The following sample URI constructs a process object that represents the OS process with process id=12 on machine marioh-dev using the third constructor.
System/OS/windows/Process/ProcessId=12,
    Machine=marioh-dev The following sample URI constructs a process object that represents the OS process with process id=12 on machine marioh-dev with user marioh and password (password). This will use the second constructor.
System/OS/Windows/Process/ProcessId=12,
    UserName=ntdev\marioh,Password=xyz,
    Machine=marioh-dev Following is a sample of process class using a static method as means of construction.

```
namespace System.Diagnostics
{
    [Folder(Uri="#System/OS/Windows/Process")]
    public class Process
    {
        private Process ( ) { }
        [Probe(Uri="ProcessId=_")]
        public static Process GetById ( int pid ) ;
        [Probe(Uri="ProcessId"),
NavigationType=NavigationTypes.EndPoint]
        public int Id { get { ; } }
        [Probe(Uri="ProcessName" ,
NavigationType=NavigationTypes.EndPoint)]
        public string Name { get { ; } }
    }
}
```

The above code illustrates another common programming model, whereby the construction of the object is handled by a static method (i.e., GetById in the example above). In this case, the static method itself is marked with the Probe attribute. The following sample URI constructs a process object that represents the OS process with process id=12.
System/OS/Windows/Process/ProcessId=12

The following sample URI constructs a process object that represents the OS process with process id=12 and then accesses the ProcessId property.
System/OS/Windows/Process/ProcessId=12/ProcessId The following sample URI constructs a process object that represents the OS process with process id=12 and then accesses the ProcessName property.
System/OS/Windows/Process/ProcessId=12/ProcessName To summarize object construction, if object construction is via a constructor, the following rules apply: the constructor must be marked with the Probe attribute; if the constructor takes two or more parameters, they are always positional; parameter types are limited to primitive types; multiple constructors can be decorated with the Probe attribute; Probe constructors cannot use the ResultType property of the Probe attribute; mode property is set to the default NavigationTypes.Navigational; specify DocName and DocPath properties of the Probe attribute for documentation purposes; constructor parameters is in-only; and the constructor is public.

If object construction is via a static method, the following rules apply: the static method must be marked with the Probe attribute; if the static method takes two or more parameters, they are always positional; parameter types are limited to primitive types; multiple static construction methods can be decorated with the Probe attribute; the ResultType property of the Probe attribute can be used to indicate a different return type; method parameters can be in-only; method is public; mode property is set the default, which is NavigationTypes.Navigational; and specify DocName and DocPath properties of the Probe attribute for documentation purposes.

While enumerating data from a particular type is as simple as attaching a Probe attribute to the enumeration method, sometimes it is very convenient to be able to quickly find the URI that corresponds to the enumeration. Imagine looking through 200 URIs for a particular type just to find the method that enumerates objects of this type. The operation is common enough to warrant the introduction of an Enumerator attribute that specifies clearly which URI corresponds to the enumeration.

There are essentially two models for enumerations in classes. One form of enumeration falls into the scope of the Enumerator attribute, where enumeration of all instances of the class (such as all running processes) take the form of static methods in the class. Another form, is enumeration of a subset of data contained within the class (such as Threads within a Process class). These types of enumerations typically take the form of methods or properties of an instance of the class. This form of enumeration may fall into the scope of the Enumerator attribute depending on the overall design of the class.

The following code shows decoration of a process class with static GetProcesses method returning a collection of running processes.

```
namespace System.Diagnostics
{
    [Folder(Uri="#System/OS/Windows/Process")]
    public class Process
    {
        [Probe(Uri="ProcessId=_")]
        public Process ( int pid ) { }
        [Probe(Uri="ProcessId",
InstrumentationMode.EndPoint)]
        public int Id { get { ; } }
        [Probe(Uri="*")]
        [Enumerator]
        public static Process[ ] GetProcesses ( ) { }
    }
}
```

The static GetProcesses method returns a collection of all currently running processes. By simply decorating the method with the Probe attribute (and associated URI), as well as the Enumerator attribute, it can be ensured that this method is invoked properly when referenced in a URI. The following sample URI returns a collection of all running processes.
System/OS/windows/Process/*

The following sample URI returns a collection of all running processes and gets the process object that represents the OS process with process id=12.
System/OS/Windows/Process/*/ProcessId=12

If the static method or property that the Enumerator attribute is applied to does not specify a type (using an overload of the attribute) it is assumed that the returned collection contains instances of the parent type. In the above sample code, it is assumed that the collection returns instances of the Process class (although it may appear obvious, in certain cases, the returned collection may contain instances of 'object' such as in interface implementations.

Most of the time, standard collections will be used and post-filtering is required to get specific instances. In cases where the returned collection is a specialized collection containing an Identifier, e.g., for the instances in the collection, instance can be more effectively reached. Using the same example as above, the Threads property of the process class may return a ThreadCollection that contains an indexer that serves as the Identifier. Following is an example where the returned ThreadCollection implements a fast retrieval mechanism via the indexer.

```
namespace System.Diagnostics
{
    [Folder(Uri="#System/OS/Windows/Process")]
    public class Process
    {
        [Probe(Uri="ProcessId=_")]
        public Process ( int pid ) { }
        [Probe(Uri="ProcessId",
InstrumentationMode.EndPoint)]
        public int Id { get { ; } }
        [Probe(Uri="Threads", NavigationTypes.Navigational,
typeof(Thread))]
        public ThreadCollection Threads { get { } }
    }
    public class Thread
    {
        internal Thread ( ) { }
        [Probe(Uri="CPUTime", InstrumentationMode.EndPoint)]
        public int CPUTime { get { } }
    }
    public class ThreadCollection : ICollection
    {
        //
        // Standard ICollection implementation
        //
        ...
        ...
        ...
        [Probe (Uri="ThreadId=_")]
        public Thread this[int tId] { get { } }
    }
}
```

If the returned collection implements a member for efficient retrieval it can be marked with the Probe attribute. The member is not limited to an indexer.

If the return type is a strongly typed array or collection that is not instrumented, a mechanism exists to do post filtering. In order for this to work, the type that is contained in the array/collection is instrumented and contains a member (property or field) that is marked with the Key attribute. If the contained type does not contain any members with the Key attribute, URI generation will stop at this point, since there is no way to figure out where to post filter. Below is an example of this scenario whereby the Process class returns a Thread array, the returned ThreadCollection implements a fast retrieval mechanism via the indexer.

```
namespace System.Diagnostics
{
    [Folder(Uri="#System/OS/Windows/Process")]
    public class Process
    {
        [Probe(Uri="ProcessId=_")]
        public Process ( int pid ) { }
        [Probe(Uri="ProcessId")]
        public int Id { get { ; } }
        [Probe(Uri="Threads",ResultType=typeof(Thread))]
        public Thread[ ] Threads { get { } }
    }
    public class Thread
    {
        internal Thread ( ) { }
        [Probe]
        [Key]
        public int Id { get { } }
        [Probe(Uri="CPUTime")]
        public int CPUTime { get { } }
    }
```

An example of a valid URI for the above is the following:
System/Os/Windows/Process/ProcessId=_/Threads/Id=_

Note that while the static portion of the URI is case insensitive, the variable portion may not be and it is up to the instrumentation developer to choose how to handle the case sensitivity issue for their particular provider.

In summary, if a member exists that represents an enumeration of the data space, the following rules apply: the member is be decorated with the Probe attribute; the member specifies a return type (using ResultType property) unless the return type is a strongly typed array; the returned type implements IEnumerable or an array; if the returned collection contains a member that can retrieve a particular instance efficiently, it is marked with the Probe attribute; the member can be decorated with the Enumerator attribute to clearly indicate its intentions; any member parameters are primitive types; any member parameters are in-only; the member can be (1) Method (2) Property (3) Field; and specify DocName and DocPath properties of the Probe attribute for documentation purposes.

Typically, classes support methods that correspond to a limited form of queries. The Process class in System.Diagnostics exposes a method called GetProcessesByName which is equivalent to SELECT*FROM PROCESS WHERE NAME=<value>. This form of "stored procedure" can be marked with the Probe attribute with an associated URI, as illustrated in the following code.

```
namespace System.Diagnostics
{
    [Folder(Uri="#System/OS/Windows/Process")]
    public class Process
    {
        [Probe(Uri="ProcessId=_")]
        public Process ( int pid ) { }
        [Probe(Uri="ProcessId",
NavigationType=NavigationTypes.Endpoint)]
        public int Id { get { ; } }
        [Probe(Uri="ProcessName",
```

```
        NavigationType=NavigationTypes.EndPoint)]
            public string Name { get { ; } }
            [Probe(Uri="ProcessName=_")]
            public static Process[ ] GetProcessesByName ( string
    processName ){ }
        }
    }
```

The following URI returns all process objects that represents the OS processes with process name=SVCHOST.
System/OS/Windows/Process/ProcessName=SVCHOST]

If a class is willing to handle queries in its entirety, the method handling the query can be attributed with the Probe attribute and take one variable as part of the URI fragment, representing the query, as in the following example code, where Process class implements a query method.

```
    namespace System.Diagnostics
    {
        [Folder(Uri="#System/OS/Windows/Process")]
        public class Process
        {
            [Probe(Uri="ProcessId=_")]
            public Process ( int pid ) { }
            [Probe(Uri="ProcessId",
    NavigationType=NavigationTypes.EndPoint)]
            public int Id { get { ; } }
            [Probe(Uri="ProcessName",
    NavigationType=NavigationTypes.EndPoint)]
            public string Name { get { ; } }
            [Probe(Uri="ProcessName=_")]
    public static Process[ ] GetProcessesByName ( string processName ){ }
            [Probe(Uri="GetByQuery=_")]
            [Query("WQL")]
            public static Process[ ] GetByQuery ( string query ){ }
        }
    }
```

A sample URI follows that returns a collection of process instances that satisfy the query. Note that the query method takes a string as input parameter.
System/OS/Windows/Process/
    GetByQuery=SELECT*FROM PROCESS WHERE NAME=SVCHST In summary, methods corresponding to queries are attributed with the Probe attribute. If a class wants to support queries in full, it attributes the method with the Probe attribute, the method signature takes a string parameter representing the query, the type is sufficiently described (including what query language), the method is attributed with the Query attribute specifying the query language it supports, and query methods can be static as well as non-static.

All methods exposed as Probe are marked as such with the ProbeTypes.Method. The definition of a method execution is that it has side-effects. An example of this would be the Kill method on the Process class. Methods are marked so that administrators have a clear understanding that execution of these methods result in a state change. Consider a slightly altered Process class that implements a kill process.

```
    namespace System.Diagnostics
    {
        [Folder(Uri="#System/OS/Windows/Process")]
        public class Process
        {
            [Probe(Uri="ProcessId=_")]
            public Process ( int pid ) { }
            [Probe(Uri="ProcessId")]
            public int Id { get { ; } }
            [Probe(Uri="ProcessName")]
            public string Name { get { ; } }
            [Probe(Uri="Kill", ProbeType=ProbeTypes.Method)]
            public void Kill ( ){ }
        }
    }
```

Here, the ProbeTypes.Method is used to indicate that this is indeed a method with side-effects, as well as InstrumentationMode.EndPoint. Following is a sample URI that kills a process with id 0 (idle process):
System/OS/Windows/Process/ProcessId=0/Kill Note that methods with side-effects can be static as well as non-static.

In summary, a method is considered an Operation if the method has side-effects, a method is decorated with the Probe attribute; parameters passed to the method are primitive types and in parameters, methods can be static and non-static, a method can be public, DocName and DocPath are specified properties of the Probe attribute for documentation purposes, and if the method takes two or more parameters they are always positional.

Probe types provide documentation for each URI. Documentation falls into the following categories: a short one sentence description for each URI; a browser compatible help-link that provides extended documentation; parameterized URI(s) require documentation for each parameter so that users know how to form it, as well as at least one fully worked out example, optionally, each parameterized documentation section can provide additional help; and, a set of tags that act as standardized keyword searches inside the windows instrumentation catalog.

In order to avoid cluttering the code with all the required documentation, a DocName property can be set in the declaration of the Probe attribute together with the DocPath property (XPATH based) to reference specific portions of an XML document. A fully documented version of the Process class can be seen below.

```
    [Folder(Uri="#System/OS/Windows/Process")]
        public class Process
        {
            [Probe(Uri="ProcessId=_", DocName="docs/process.xml",
    DocPath="//Process/ProcessConstructor")]
            public Process ( int pid ) { }
            [Probe(Uri="ProcessId",
    NavigationType=NavigationTypes.EndPoint,
    DocName="docs/process.xml",
    DocPath="//Process/ProcessId")]
            public int Id { get { ; } }
        }
```

The associated XML document is as follows.

```
    <Process>
        <ProcessConstructor>
            <Description lang="en"> Returns a process with the
    specified process ID </Description>
            <Description lang="se"> Aterlamnar en process med den
    specifierade process identifikationen
    </Description>
            <UriHelp>
                <_1 lang="en"> The process identifier specified as an
    integer value </_1>
                <_1 lang="se"> Process identifikations nummer
```

-continued

```
specificerad som ett integer nummer </_1>
            <Example> #System/OS/Windows/Process/ProcessId=0
</Example>
        </UriHelp>
        <HelpLink xmlns:xlink="http://www.w3.org/xlink"
xlink:href="http://www.TheFinalProcessClass.com/Process.html"/>
        <Tags>
            <Tag name="Process"/>
            <Tag name="Application"/>
            <Tag name="Service"/>
        </Tags>
    </ProcessConstructor>
    <ProcessId>
        <Description lang="en"> Returns the process ID associated
with the process </Description>
        <Description lang="se"> Aterlamnar process identifikationen
associerad med en process </Description>
        <UriHelp>
            <_1 lang="en"> The process identifier specified as an
integer value </_1>
            <_1 lang="se"> Process identifikations nummer
specificerad som ett integer nummer </_1>
            <Example>
#System/OS/Windows/Process/ProcessId=0/ProcessId </Example>
        </UriHelp>
        <HelpLink xmlns:xlink="http://www.w3.org/xlink"
xlink:href="http://www.TheFinalProcessClass.com/Process.html"/>
        <Tags>
            <Tag name="Process"/>
            <Tag name="Application"/>
            <Tag name="Service"/>
        </Tags>
    </ProcessId>
</Process>
```

Note that each Probe member specifies a DocName and DocPath which contains all the required documentation as stated above.

In cases where multiple member URI fragments are ambiguous, it becomes necessary to escape parameters in order to disambiguate. This situation typically arises when overloaded methods share portions of their URI fragments, indicated in the following code.

```
namespace System.Diagnostics
{
    [Folder (Uri="#System/OS/Windows/Process")]
    public class Process
    {
        [Probe (Uri="ProcessId=_")]
        public Process ( int pid )
        {
        }
        [Probe
(Uri="ProcessId=_,UserName=_,Password=_,Machine=_")]
        public Process ( int pid,
            string user,
            string password,
            string machine)
        {
        }
        [Probe (Uri="UserName")]
        public string UserName { get { ; } }
        [Probe (Uri="Machine")]
        public string MachineName { get { ; } }
        [Probe (Uri="ProcessId")]
        public int Id { get { ; } }
    }
}
```

Consider that the following URI is be specified.
System/OS/Windows/Process/ProcessId=12, UserName=marioh,Password=xyz,Ma chine=marioh-dev
Since both the first and second constructor match this URI, the URI input will have to escape the parameters:
System/OS/Windows/Process/ProcessId="12", UserName="marioh",Password="x yz", Machine="marioh-dev"

In addition, parameters which are arrays of primitive type use the comma character ',' as the element separator in the URI.

```
namespace System.Diagnostics
{
    [Folder (Uri="#System/OS/Windows/Process")]
    public class Process
    {
        [Probe]
        public static GetProcesses ( int [ ] pids )
    }
}
```

Following is a sample URI where the portion as numbers 0, 1, 2, 3 get passed as the array parameter (pids).
System/OS/Windows/Process/GetProcesses(pids="0, 1, 2, 3")
Array parameters that can accept a null value are used as in the following.
System/OS/Windows/Process/GetProcesses(pids=" ")
Error reporting can be done using an exception mechanism. From an instrumentation developers point of view, there are essentially two categories of exceptions that can be thrown from Probe code: underlying component exceptions, where this includes exceptions such as ThreadAbortedException, as well as any exceptions not directly thrown by the instrumentation code; and instrumentation code specific exceptions.

Application Management

A goal is to make application management identical (or as close as possible) to the client loadable development process. Following are additional API(s)/steps required to fully instrument an application or service. The following small sample application consisting of two classes will be used to illustrate these APIs/steps.

```
using System;
using Microsoft.Management.Instrumentation;
namespace AppManagement
{
    public class MyApp
    {
        private static RequestQueue queue ;
        public static RequestQueue GetQueue ( )
        {
            return queue ;
        }
        static void Main(string [ ] args)
        {
            queue = new RequestQueue ( ) ;
            Console.WriteLine ( "Hit <enter> to register app" ) ;
            Console.ReadLine ( ) ;
            Console.WriteLine ( "Hit <enter> to quit app" ) ;
            Console.ReadLine ( ) ;
        }
    }
    public class RequestQueue
    {
        private static int maxNumberOfRequests = 10;
        public int MaxNumberOfRequests
        {
            get { return maxNumberOfRequests; }
        }
    }
}
```

The sample application has a main class that contains an instance of a request queue. In the sections below, it will be shown how to expose the maximum number of requests from a running instance of this application.

The very first thing an application must do to be instrumented is to register itself and include the associated application instance id. The instance id can be any string that is unique across all instances of the application. If an instance id is not specified, the process id is used. The URI(s) for instrumented applications look the same as in-process instrumented assemblies with the exception of an 'appinstance' fragment of the URI:

System/Applications/MyApp[id="xyz"]/probeUri

Note that the application instance fragment can be changed by the developer.

Two API(s) can be used for registration:

| API | Description |
| --- | --- |
| bool Register ( ) | Registers an application instance with the default instance id being the process id. |
| bool Register (string id) | Registers an application instance with the specified instance id. |

To include registration code, the sample application can be modified slightly in the main method.

```
[assembly:ApplicationProbe("#System/Application/MyApp")]
    static void Main(string[ ] args)
    {
        queue = new RequestQueue ( );
        Console.WriteLine ( "Hit <enter> to register
app" );
        Console.ReadLine ( );
        System.Management.Instrumentation.Application.Register ( );
        Console.WriteLine ( "Hit <enter> to quit app" )
;
        Console.ReadLine ( );
    }
```

The modified sample contains a call to the first version of the Register API that relies on the default application instance id to be the process id. Behind the scenes, the Register API sets up the IPC endpoint so that future client requests are routed to the correct instance. When the application exits or the application domain from which the Register call was made is unloaded, the infrastructure handles deregistration automatically. If an application enters a suspended state and wants to un-register manually, the Suspend/Resume API(s) are available.

| API | Description |
| --- | --- |
| bool Suspend ( ) | Suspends the publishing of instrumentation data from application |
| bool Resume ( ) | Resumes the publishing of instrumentation data from application |

An application may also unregister itself explicitly by using the Unregister method.

| API | Description |
| --- | --- |
| bool Unregister ( ) | Unregisters the application. |

In addition, an assembly level attribute called ApplicationProbe needs to be declared to specify the URI prefix that the application supports.

When generating URI(s) to this application, the infrastructure will use this URI to identify which URI prefixes are owned by this application and append the instance id fragment.

System/Applications/MyApp[id="xyz"]/probeUri

Alternatively, the application URI can include a variable portion to replace the default ([id=_]).

Now that the application has been registered and is identifiable, the next step is to expose the information from the application. The model used for exposing the information is no different from in-process instrumented assemblies, and includes the Decorated classes/members to expose management information.

```
[Folder]
public class MyApp
{
    private static RequestQueue queue ;
    [Probe (Uri="/RequestQueue")]
    public static RequestQueue GetQueue ( )
    {
        return queue ;
    }
    ...
    ...
    ...
    ..
}
[Folder]
public class RequestQueue
{
    private statis int maxNumberOfRequests = 10;
    [Probe]
    public int MaxNumberOfRequests
    {
        get { return maxNumberOfRequests; }
    }
}
```

Note that the Folder attribute uses the default constructor and does not specify a URI to the type since the assembly level ApplicationProbe attribute has been used to define the URI prefix for all instrumented types. The possible URI(s) for the above are:

System/Applications/MyApp[id=xyz]/MyApp/RequestQueue

System/Applications/MyApp[id=xyz]/MyApp/RequestQueue/MaxNumberOfReques ts

In addition to the URI(s) generated for an instrumented application, the following URI is generated automatically when the application manifest is built:

System/Applications/MyApp/id=*

This result of executing this URI is a list of all running instances of the application. Note that since all URI(s) can be case in-sensitive, it is important to avoid defining application instance ID(s) that only differ in casing.

Model-Based Management System

Figure 5:
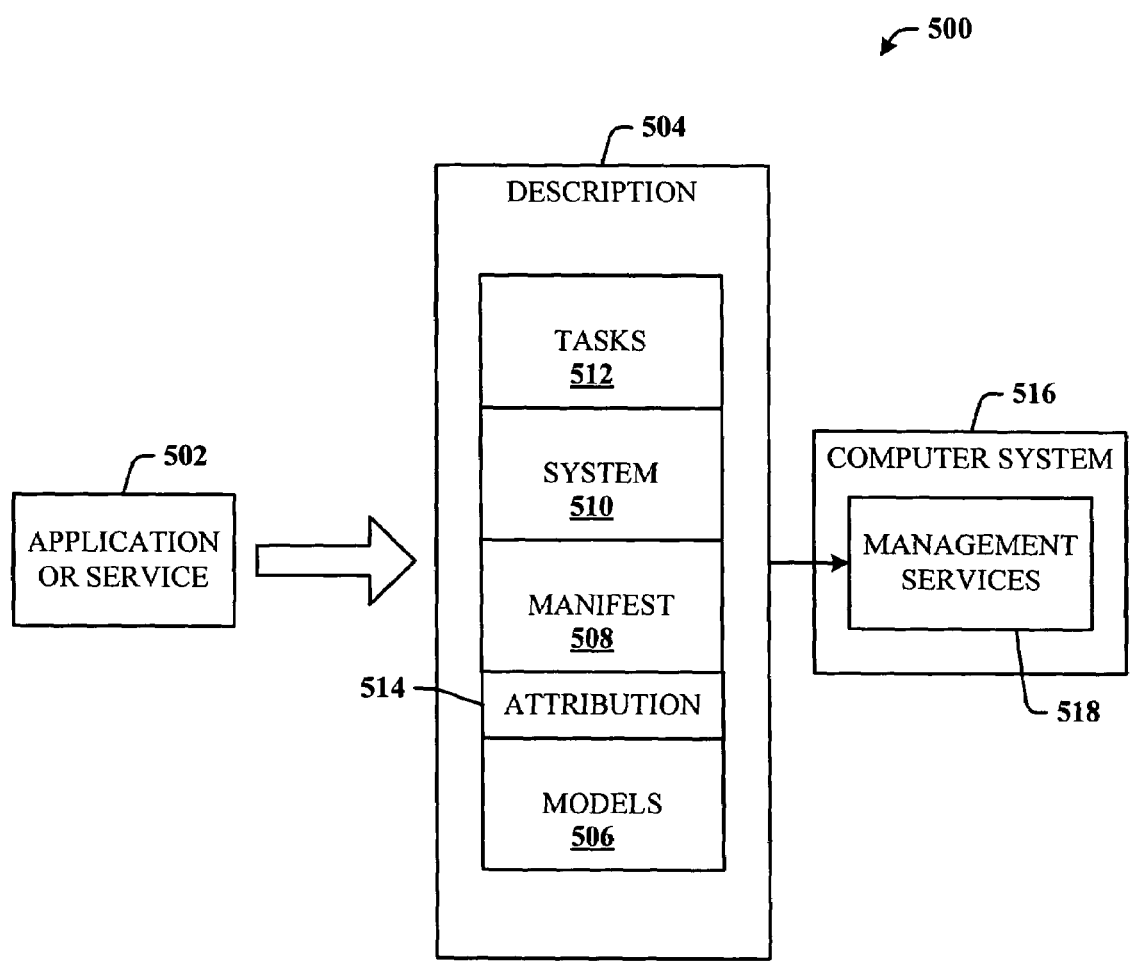
FIG. 5 illustrates architecture that uses attribution to facilitate model-based management of applications or services.

Referring now to FIG. 5, there is illustrated architecture 500 that uses attribution to facilitate model-based management of applications or services. The model-based management approach allows a developer to describe an application or service 502 in terms of its constituent components and desired states in terms of functionality, configuration, security, and performance. Thus, an application or service description 504 facilitates describing the application or service 502 in terms of one or more manageable components, including at least a models component 506, manifest component 508, system component 510, and tasks component 512. The model-based management system 500 utilizes an attribution component 514 to facilitate attribution of the source code from the model component 506 to the manifest component 508.

A computer system 516 uses the application or service description 504 at installation of the application 502 to configure management services 518 associated with the computer operating system. The management services 518 then help ensure availability of the application or service 502 through automatic management actions such as configuration management, problem detection, diagnosis, and recovery. The model 506 also describes common tasks that the administrator may perform.

The model-based management architecture 500 facilitates a lower total cost of ownership, and is used across the application lifecycle from development, to deployment, operations, and business analysis. Generally, a developer begins by creating one or more models of the application or service in terms of how the application works, its constituent components, the desired health states that the developer defines and chooses to monitor, configuration aspects at least with respect to how it will be installed and what settings the application or service will require and, administrative tasks and the scheduling thereof. The source code of the model is then attributed (or tagged) at specific areas for manifesting.

The models are rolled up into instrumentation manifests. The models tend to be in the form of text documents, spreadsheets documents, etc., structured documents that are either transformed through codes, scripts, tools, or manually into the manifest that tend to be more XML schemas, and further machine processed and machine read. That is to say the models documents are more human readable and the manifests are more machine readable. The manifests are then used to facilitate system management.

The attribution subcomponent 514 is associated with source code attribution. Attribution is used to express management information along with the code to which it pertains. Without attribution, two separate pieces of code would need to be written—one for normal application processing and one to expose it to management. Attribution within the source code is used to describe which parts of the code (called probes) should be used to determine and/or correct health, as well as specify when to execute monitoring rules. Probes can be exposed from components that access existing operating system APIs (Application Program Interfaces) or from components loaded inside running applications or services. In both cases, the developer adds attribution to indicate what subset of the types within the components should be exposed and how they should be identified. Probes are identified using URIs (Uniform Resource Identifiers) within an administrator namespace. At runtime, a probe is retrieved by identifying it from within a catalog of all probes on the computer, and following the associated information about the probe.

Source code attribution can also provide instructions to the monitoring service, for example, to attribute functions that should be used as monitoring rules and loaded at startup, polled periodically, run on an event, etc. This attribution can be automatically processed and put in the manifest the same way as the instrumentation. Thus, attribution is not just instrumentation, but for other management purposes as well. Attribution can also be used to support administrative tasks and/or corrective actions.

Figure 6:
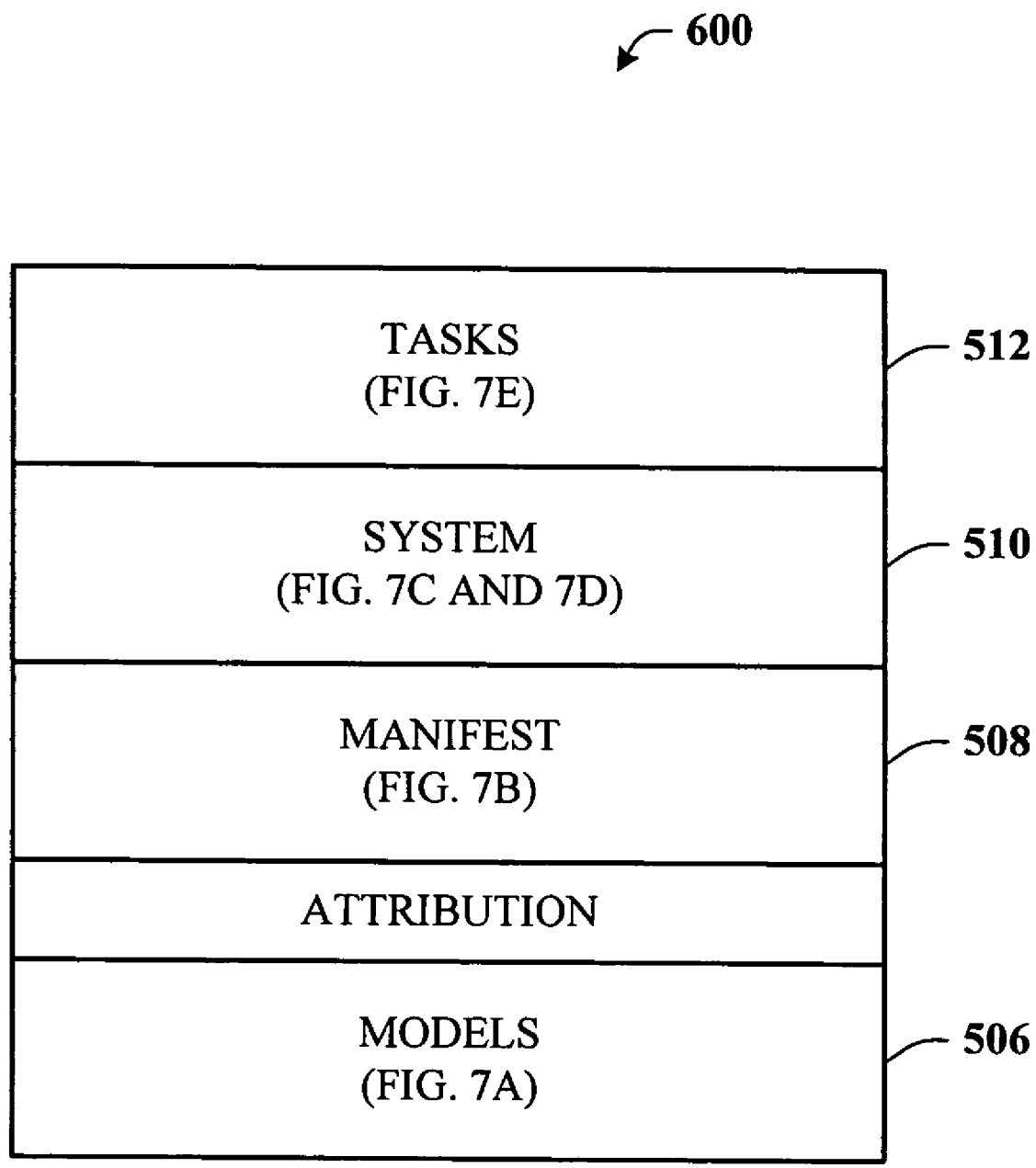
FIG. 6 illustrates a drawing map related to describing principal components of the model-based management architecture.

Referring now to FIG. 6, there is illustrated a drawing map 600 related to describing principal components of the model-based management architecture 500. The architecture includes the models component 506 that is described in relation to FIG. 7A, the manifest component 508 that is described in relation to FIG. 7B, the system component 510 that is described in relation to FIG. 7C and FIG. 7D, and the tasks component 512 that is described in relation to FIG. 7E. Attribution has already been described, and will be addressed throughout the specification.

Figure 7B:
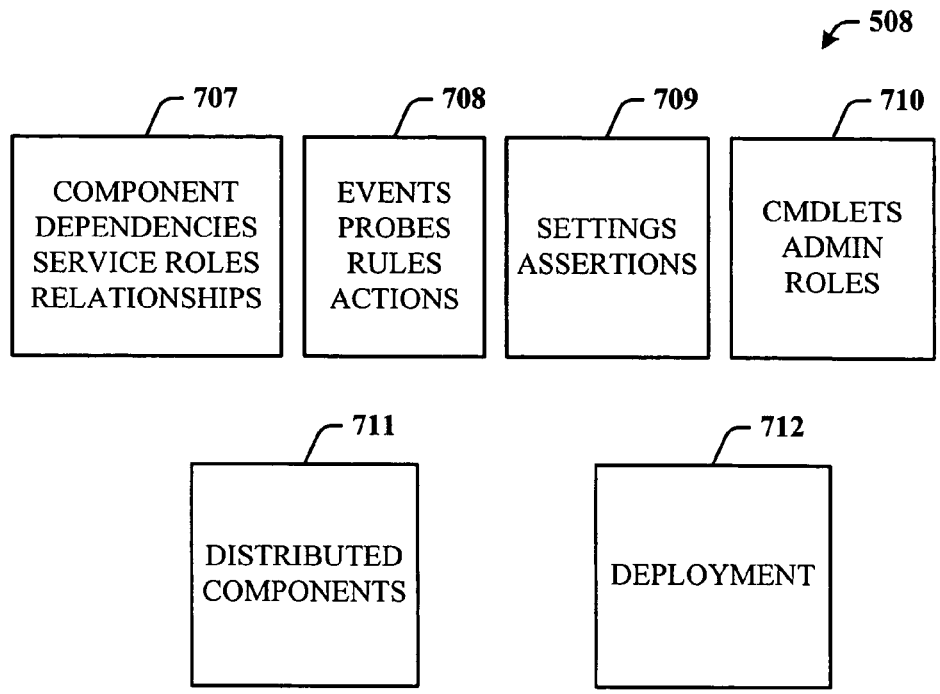
FIG. 7B illustrates blocks associated with the manifest component of the model-based management architecture.
Figure 7A:
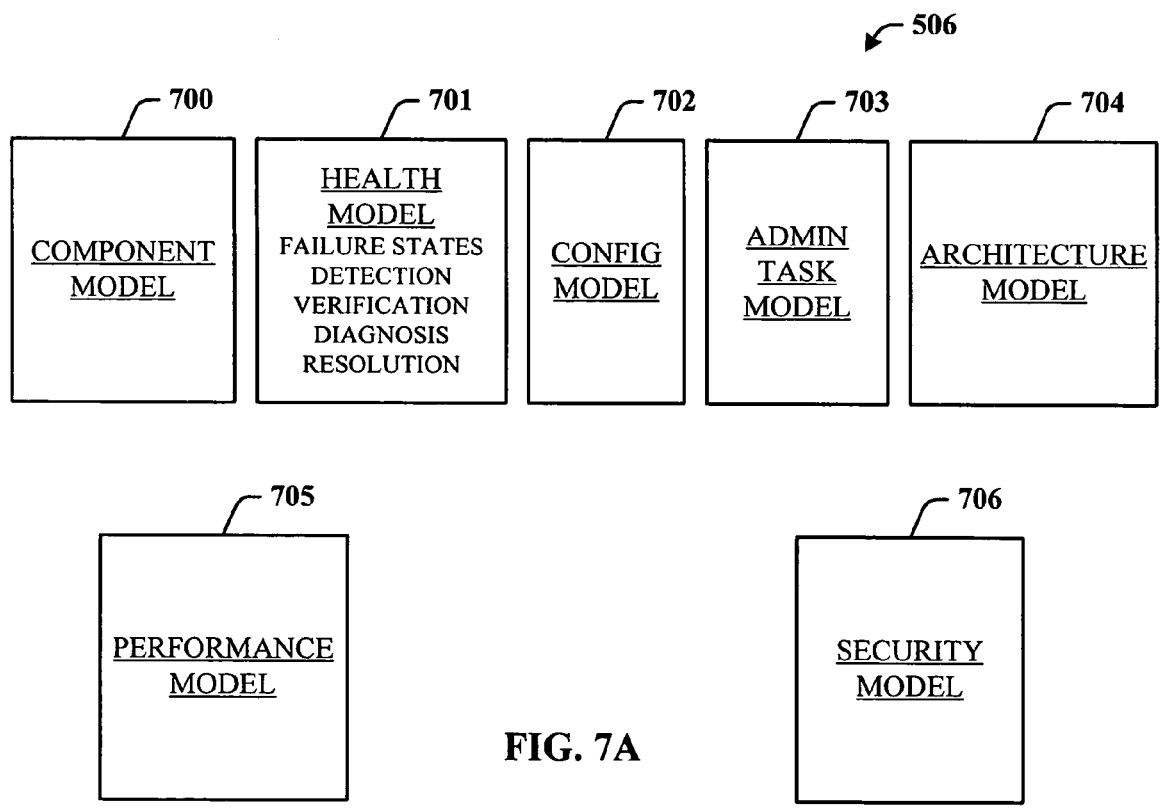
FIG. 7A illustrates blocks associated with the models component of the model-based management architecture.

Referring now to FIG. 7A, there are illustrated blocks associated with the models component 506 of the model-based management architecture. Models are developed for the components making up an application, health states and recovery, configuration settings, and administrative tasks. In support thereof, there is a component model subcomponent 700 for modeling any and all components of the system (and relationships, dependencies and service roles associated therewith). The component model 700 describes the files, configuration, different ways the application can be installed, and more.

A health model subcomponent 701 can be developed to describe the various failure states, and the way that the application or service could fail. The health model 701 describes the steps that would need to be taken to automate the health features. The health model 701 represents at least the failure states, detection the states, verification, diagnosis, and resolution of the system states. The health states can be described in terms of what criteria must be met to be considered completely healthy, to completely fail and any intermediate states, e.g., degraded performance, partially working, some of the customer functionality is working, and is the application or service delivering the expected level of service. Health also considers that functionality could be fine, but performance is substandard indicating that the application or service is not healthy.

A configuration model subcomponent 702 is associated with modeling the system configuration. The configuration model 702 is used to describe the application settings, user controls, default values, various restrictions, etc. An administrative task model subcomponent 703 is associated with modeling administrative tasks, and includes the actions a user can take upon a system, such as start, stop, add user, add database, and corrective actions that can be called from the health model 701. The model 702 enumerates all that can be done with the application or service.

An architecture model 704 is used to describe distributed environments and associated deployment, normally associated with, for example, a large network of clients having the same or similar hardware and software settings and configuration, and distributed databases. Thus, a local application may be dependent on a remote disk array. At deployment, the disk array needs to be instanced at the deployment level with a manifest and using URIs. Since the URI is machine independent, distributed systems can also obtain the benefits of the model-based management system. A performance model 705 can be developed to describe the way in which the developer wishes to use metrics for monitoring performance of the application or service. This is closely related to health of the system. A security model 706 can be generated that describes the types of security associated with the application or service. Note that the number of models provided herein is not exhaustive, since the developer can provide many different models for managing various aspects of the application or service.

The subject model-based system can employ various artificial intelligence based schemes for carrying out various aspects thereof. For example, with respect to models, a process for determining what models can be utilized for a given instance or implementation can be facilitated via an automatic classification system and process. Moreover, such classifiers can be used to build operational profiles of the system that start to detect system patterns, and learn what is a good state, a bad state and, successful and unsuccessful transactions.

This information can then be fed back into the corresponding model and used as an updated model for a follow-on system. Such classification can employ a probabilistic and/or statistical-based analysis (e.g., factoring into the analysis utilities and costs) to prognose or infer an action that a user desires to be automatically performed. For example, a support vector machine (SVM) classifier can be employed. Other classification approaches include Bayesian networks, decision trees, and probabilistic classification models providing different patterns of independence can be employed. Classification as used herein also is inclusive of statistical regression that is utilized to develop models of priority.

As will be readily appreciated from the subject specification, the model-based system can employ classifiers that are explicitly trained (e.g., via a generic training data) as well as implicitly trained (e.g., via observing user behavior, receiving extrinsic information) so that the classifier(s) is used to automatically determine according to a predetermined criteria, for example, what initial settings to use for a given implementation, and then adjusting the settings over time as the system matures and experiences various loading conditions with respect to data, number of installed applications, and the number of nodes with which to interact. For example, with respect to SVM's that are well understood, SVM's are configured via a learning or training phase within a classifier constructor and feature selection module.

A classifier is a function that maps an input attribute vector, x=(x1, x2, x3, X4, xn), to a confidence that the input belongs to a class—that is, f(x)=confidence(class). In the case of management systems, for example, attributes are system parameters of desired states, and the classes are categories or areas of interest (e.g., all drives, all native process). Classifiers can also be employed to capture and analyze transaction logs, look for patterns, and diagnose a system by looking for successful and unsuccessful patterns.

Configuration health involves, for example, changing a queue size from five to ten, and determining what impact the change can have on the application, service, or system. The same applies for security and performance, where a classifier can be employed to monitor performance counters and make system changes accordingly to optimize performance. Security can also be monitored and analyzed for patterns, the impact of which can be used to suggest or alter security polices. Thus, it is to be appreciated that health is a broad concept that can be applied to many areas of the system. In a system-wide scope, performance can be good, but security could be poor. Thus, a holistic view that crosses many disciplines of the system is advantageous.

The desired states of the administrator can be expressed in the code, which is surfaced in the manifest and passed for monitoring by the monitoring service. The system can, based upon instructions in the manifest, monitor the application or service and alert the administrator when the application or service does not meet the performance, and based on the instructions, take corrective actions. For example, where a test setting for e-mail is not maintained, but falls below a threshold for a period of time, another machine can be added until the load subsides, and the network traffic can also be used as a trigger increasing the number of resources to handle the given load. A goal is automate as much a possible so that the administrator is involved only when manual action is required.

The model-based management system is composable. It is component based, with a component comprising most anything. Thus, the system can be reduced to its lowest manageable piece and composed back up. In a database, for example, there is the application, with instances, the database, tables, and stored procedures, and can be reduced as low as a single file. Consider a 401k application. The 401k application can depend on a database, a web sever, and the customer's own business logic, down to a database that depends on the operating system and associated. It is desirable to manage and report at the various levels.

Applications are described through relationships between components. These relationships can express how an individual application is assembled (e.g., SQL server contains a service, instances, and databases), platform requirements (e.g., operating system and other applications), and communication to other components (the web server connecting to the SQL server). A single administrator may care about a database and a single machine, whereas a finance administrator may care about the 401k application, and the CIO cares about all of the applications and machines. The models, reporting, and desires states should process everything such that individual metrics can be referenced to determine if the system is doing what is expected.

All models are tied into a URI namespace, providing a standard way of navigating the system, enumerating all components installed, and asking the component what it provides, what is considered healthy, what events does it have, what error events occurred in the last day or hours, what configuration settings are included, what changes occurred in the last hour, etc.

Referring now to FIG. 7B, there are illustrated blocks associated with the manifest component 508 of the model-based management architecture. The manifest that ships with the application contains information from the models and source code attribution in a machine-readable form for use by management system services. Administrative tasks for an application are defined within the manifest. There can be a number of manifests generated that correspond to the models, including the following; a first manifest subcomponent 707 associated with component dependencies, relationships between the components, and service roles; a second manifest subcomponent 708 associated with events, probes, rules, and actions; a third manifest subcomponent 709 associated with settings and assertions; a fourth manifest subcomponent 710 associated with commands (i.e., cmdlets) and administrative roles; a fifth manifest subcomponent 711 associated with distributed environments; and a sixth manifest subcomponent 712 associated with deployment.

The manifest is the "bridge" between developer and, the operations team and the administrator, and is created automatically with a tool that sweeps the models for the attributed code. The component manifest 707 is used by a setup engine to determine how to install the application or service. It describes the logical components, files, where the files should be installed, and configuration settings (or any settings). Dependencies are what need to be defined before installation, and include various roles, so that the application can be installed in different modes, with varying degrees of security, and different operational profiles. The component manifest 707 makes it easier for the user and/or the system to know what to do manually and automatically. Manifest granularity can get down to one manifest per component.

Conventionally, many more files are installed than what are actually needed. The manifest allows installing only those files that are needed. This improves at least performance and security. Software dependencies are defined in the manifest 707. At the application level, the dependencies can be specific to a single machine and define component relationships and the hardware resources. A computer can be described by a manifest, for example, the application should be deployed on a dual-processor machine of a specific manufacturer, or interface to a 4-processor machine. This manifest 707 describes the processor, memory, drives, etc., to the level of hardware granularity needed for the implementation. Thus, management can be more proactive then reactive, as in conventional systems. A hard disk failure can be determined to be caused by thermal failure, for example, where the system temperature is monitored over time, and the power supply rail voltages are monitored, but found to be sufficient.

The health model 701 is used to spawn the health manifest 708. The health manifest 708 is populated from the health model 701 using attribution and other tools. Events are not called out in the model 701, but in a resource file. A tool sweeps the resource files and attributed source code, and populates the health manifest 708. Failure states can be detected by watching for a predefined sequence of events or monitoring performance counter thresholds. Instructions can be provided to the system as to how to address such failure states. The health model is transformed into rules. The health manifest 708 includes ruletype event sequences with parameters such as event1, event2, time3, etc.

The configuration model 702 describes what settings are included and is transformed into the settings and assertions manifest 709 that provides instruction schema for the system to create the settings when the component is installed.

The administrative task model 703 is transformed into actions via the cmdlets and administration roles manifest 710. For example, if a data backup is required, the cmdlet is the actual code or URI used to facilitate the backup task. Where numerous administration tasks need to be performed, the manifest 710 provides the URI path to the those commands and perhaps to the code. The cmdlet can be processed through assertion on the code or may require external code. The administration role is another abstraction supporting, for example, multiple classes of users that manage this application or service, and the level of control they each can exercise. This associates with role-based access. Metadata is required that describes the roles of the various users and their allowed capabilities. Roles cross all aspects of the system-who is allowed to install, who can change monitoring, who can look at health, who can resolve alerts, who can take these various actions, etc.

The task model 703 defines what the developer thinks the administrator should do, as expressed in the manifest 710, and customized by the operations teams for their environment. These customizations can be done at the class level and instance level. Changes can be made in the manifest at the class level, at the instance level, and changes can be made directly at runtime. A very powerful feature of the disclosed model-based management architecture is that capabilities can first be described at the class level, whereas at runtime, access is to the instance space.

The architecture model 704 surfaces the distributed components manifest 711 and the deployment manifest 712. Network connections between machines, hardware requirements, are covered here, for example. The deployment manifest 712 supports at least applications comprising web servers, middle tier servers, and database servers, and includes frontend/backend applications, network connectivity between the two applications, and describes the relationships between individual nodes. Deployment time creates instances of those described in the overall architecture model 704. The performance and security models (705 and 706) can each support corresponding manifests (not shown) that describe those related functions and operations.

Returning to the employment of machine-based learning, a classifier can be used to select and dynamically generate manifests of selected portions of the model code based on requirements during, for example, first deployment. Default models can be automatically generated using more attribution or less attribution. Over time, as system operational information becomes available, this information can be analyzed such that the level of granularity of the manifest can be adjusted to, for example, more closely monitor the system in specific areas based on the latest data trends and logs. The updated manifest is then regenerated and employed as needed to more closely monitor the application or service.

If a manifest describes the default installation or recommended best practices from the manufacturer, an administrator may want to change things. For example, with respect to health rules the administrator may want to change a threshold from thirty to forty, or install components, or override a security policy. This can be done by creating a customized version of the manifest to override the manifest bundled by the manufacturer. A different version can be detected during installation, allowing a user the option to select the default manifest or the custom manifest. Alternatively, there can be a separate file the system reads that lists the overrides, which are then displayed for selection by the user to be applied to the default manifest or during installation such that the default settings are overridden.

With respect to the distributed applications, the administrator can more generally stipulate that he or she wants three of these, four of that, and six of those, all wired in this configuration. The administrator may customize the deployment manifest 712 accordingly for the given environment.

Referring now to FIG. 7C, there is illustrated a block diagram of core system APIs of the system component 510 utilized for managing an application or service 714 in accordance with the model-based management architecture. The system component 510 includes the application or service 714 that is to be managed. The system 510 includes a number of APIs in cooperative communication for facilitating the model-based management. The system 510 is comprised of multiple services that are configured by information within an application manifest (described with respect to FIG. 7B).

The system 510 consists of the services necessary to ensure availability of an application and uses the desired states expressed in the manifest component 508 and modified by the administrator to perform the following: installation to verify dependencies and install only the necessary files, settings, and security; event subscriptions, to subscribe to events and to forward as specified; polled instrumentation to periodically collect instrumentation and counters; and, synthetic transactions or simulating user transactions. One of the best ways to determine if an application is available and performing as expected (the desired state) is for the monitoring system to use the application as if it were a user. This is active monitoring. A potential second way is active monitoring of real user transactions, and reporting aggregate data up to the system for analysis. These steps close the loop and show that internal application data is not sufficient. Model-based management also works outside the application.

The system 510 uses the desired states expressed in the manifest component 508 to also perform task scheduling for automatic task management; role-based access to restrict access to program functions; monitoring to detect problems, diagnose root causes, take corrective actions, and notify the system administrator when intervention is necessary; and, central configuration to customize policy for the above and apply to many machines.

There is provided an installation API 716 in communication with the application 714 to facilitate installation of the application, application updates, and patches. The installation API 716 takes the manifest assemblies via the code and instantiates the assemblies, by instructing the system to install this component, this manifest, and this version, on this machine. The installation API 716 has associated therewith a protocol 718 and a viewer 720. The protocol 718 facilitates communicating API-related data with other components of the system 510. The viewer 720 displays data related to the installation API 716.

The installation API 716 not only facilitates installation on a single machine, but also for distributed applications or services involving both local and remote systems, as well as for hardware provisioning and abstraction. For a distributed data center environment, it is important to be able to abstract the hardware system generally, and to a finer granularity, to a specific machine abstraction. A protocol, as contemplated herein with respect to an API, is the rules that govern the transmission and receipt of that API-related data. The viewer 720, as understood in this description, is a program that displays data related to the API, here the installation API 716. The API data includes but is not limited to sound files, video files, for example, and other types of data files.

The system 510 includes a configuration API 722 in communication with the application 714 to facilitate configuring the application 714. The configuration API 722 has associated therewith a schema 723, a protocol 724 and a viewer 726. The schema 723 defines the structure and contents of the data passed between the API 722 and the application 714. The protocol 724 facilitates communicating API-related data with other components of the system 510. The viewer 726 displays data related to the configuration API 722.

There is also included an administration API 728 that facilitates many-to-one administration for distributed environments. The API 728 communicates with the managed application 714 and also remote systems (not shown). The API 728 has an associated protocol 730 and a viewer 732. The system 510 includes a performance counter API 734 in communication with the application 714 to facilitate tracking counter variables that are used in managing the application 714. The counter API 734 has associated therewith a protocol 736 and a viewer 738. The protocol 736 facilitates communicating API-related data with other components of the system 510. The viewer 738 displays data related to the counter API 734. Performance counters are exposed by the application 714 and publishes the counters through the viewer 738.

There is provided an instrumentation API 740 in communication with the application 714 to facilitate configuring instrumentation and the passing of instrumentation data with the application 714. The instrumentation API 740 has associated therewith a protocol 742 and a viewer 744 through which the instrumentation is exposed. The protocol 742 facilitates communicating API-related data with other components of the system 510. The viewer 744 displays data related to the instrumentation API 740.

The instrumentation API 740 communicates with the managed application 714 via IPC (InterProcess Communication) 746. IPC is the automatic exchange of data between one program and another, either within the same computer or over a network. One example of an IPC function is performed when a user manually cuts and pastes data from one file to another using a clipboard. The counters are always published via shared memory, while the instrumentation is delivered on demand. The instrumentation API 740 also includes a schema 748 that describes the surface of the instrumentation classes in manner similar to an events schema. There may also be included an instrumentation log (not shown); however, many administrators prefer to utilize an event log.

The system 510 includes a catalog 747 that is the store that keeps track of and caches component and mode information. This mode information comes from the manifests at install and, parts are dynamic and updated at runtime. The catalog 747 includes a catalog API and provides access to events, counters, instrumentation, and configuration data, to name just a few types of the data stored therein. Access to the catalog 747 is facilitated by a protocol 751 and viewer 753. A central configuration database contains a rolled up or aggregate view of the catalog across multiple managed nodes.

The system 510 includes an events API 750 in communication with the application or service 714 to facilitate implementing and tracking events that are used in managing the application 714. The events API 750 interfaces to an event log 752 that serves as a store for all events that occur. The events API 750 has associated therewith a protocol 754 and a viewer 756. The protocol 754 facilitates communicating API-related data with other components of the system 510. The viewer 756 displays data related to the events API 750. Communications with the application 714 is in accordance with an events schema 758 that defines the structure and contents of the data passed therebetween. The events are published as they are described or happen. The schema describes the surface of the event.

The system 510 includes an automation API 760 in communication with the application 714 to facilitate automating procedures that might normally be done interactively with the application 714. The automation API 760 has associated therewith a protocol 762 and a shell 764. The protocol 762 facilitates communicating API-related data with other components of the system 510. The shell 764 provides a user interface to the automation API 760 to facilitate user interaction therewith for entering and displaying data related to the automation processes and user control of the automation processes.

The system 510 further includes a scheduled tasks API 766 in communication with both the application 714 and the automation API 766. The scheduled tasks API 766 facilitates scheduling jobs or programs for at least the automation API 760 and the managed application 714. It maintains a list of jobs to be run and allocates resources accordingly. The scheduled tasks API 766 has associated therewith a protocol 768 and a viewer 770. The protocol 768 facilitates communicating API-related data with other components of the system 510. The viewer 770 displays data related to the scheduled tasks API 766. A task schema 772 defines the structure and contents of the data passed between the tasks API and other components. Automation and tasks data is received from the task and cmdlets models. These features can be automated through the management shell either locally or remotely. The scheduling system can run these, e.g., a backup at 3 AM.

Figure 7D:
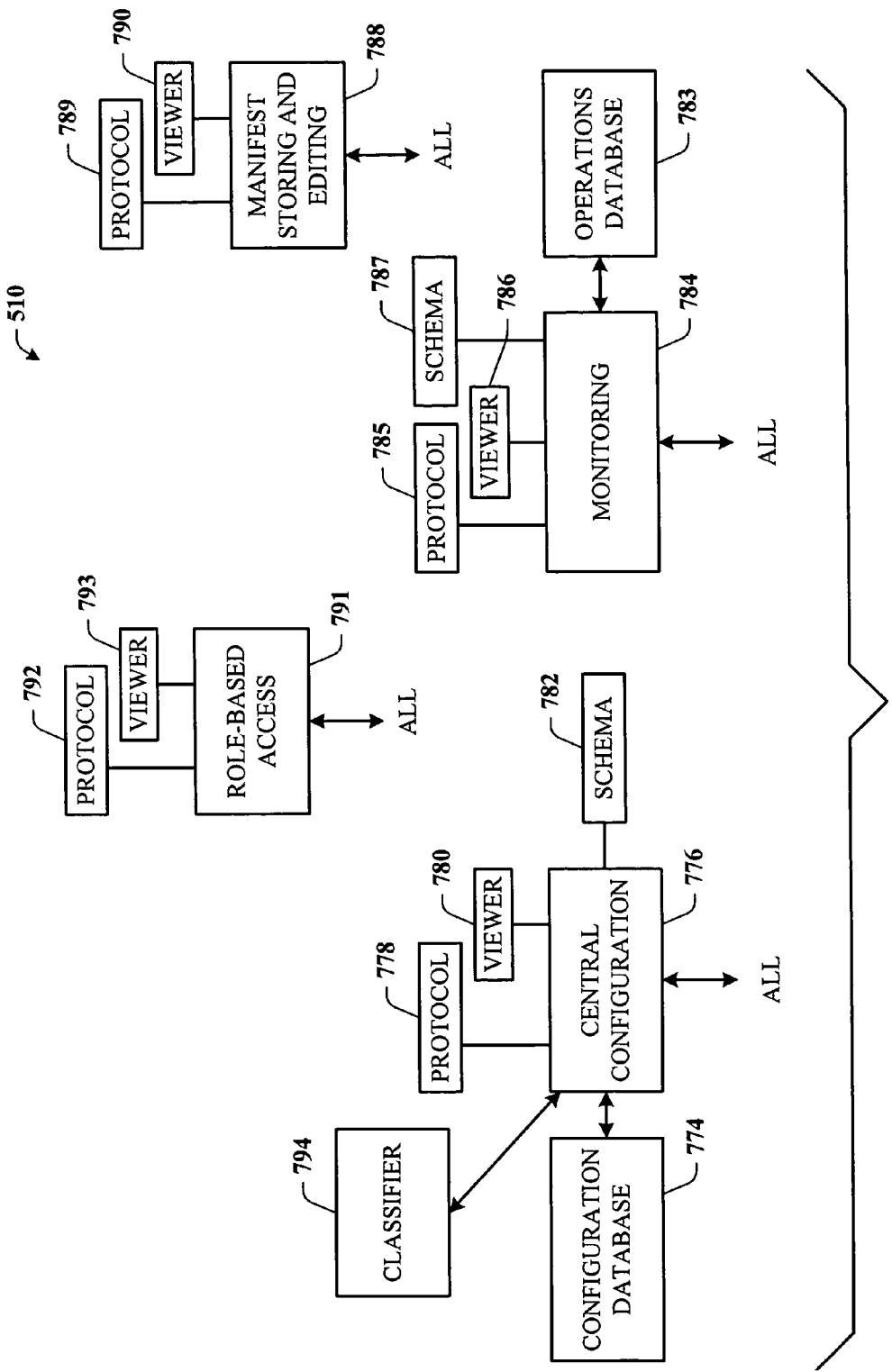
FIG. 7D illustrates a block diagram of management-related APIs of the system component of the model-based management architecture.

It is to be appreciated that components described in FIG. 7C can represent those of a local implementation, while the components of FIG. 7D can represent those associated with a distributed implementation such that analysis occurs across many machines and software systems. Thus, in a distributed implementation, the components of FIG. 7D communicate with at least one of the local systems of FIG. 7C, but typically a plurality of such local implementations in a wired and/or wireless regime. In the local implementation, the system 510 can also include any or all of the components of FIG. 7D, including a local monitoring service API 765. The local monitoring service API 765 also includes a protocol 767, a viewer 769, and schema 771, each of which facilitates functionality similar to such components of other APIs. In a distribute implementation, the local monitoring service 765 then passes monitoring information to the distributed monitoring service, described hereinbelow.

Referring now to FIG. 7D, there is illustrated a block diagram of management-related APIs of the system component 510 of the model-based management architecture. There is provided a configuration database subcomponent 774 to which access and control is provided via a central configuration API 776. The central configuration API 776 interfaces with all subcomponents of the system 510, and has associated therewith a protocol 778 and a viewer 780 for communication and interaction and, a schema component 782 that describes the shape of the configuration settings and attributes, such as assertions and default values. The protocol 778 facilitates communicating API-related data with other components of the system 510.

There is also provided an operations database subcomponent 783 that serves as a repository for operations-related data of the management system, e.g., reporting, current state, and historical data. A monitoring API 784 interfaces to the operations database 783 and all subcomponents of the model-based management system, and further has associated therewith a protocol 785, a viewer 786, and a schema 787. The protocol 785 facilitates communicating API-related data with other components of the system 510. The viewer 786 displays data related to the monitoring API 784. The schema 787 provides the definition for the entire operations database 783 at least with respect to the structure and type of contents that each data element within the structure can contain.

Central configuration can touch all of the APIs, and is used by the administrator to set configuration details, which can include details for the distributed application scenario, such as on what machines should the application be installed. Configuration also includes monitoring configuration. For example, all machines must exhibit no less than 80% CPU utilization for five minutes. Thus, the monitoring system uses the configuration system. Monitoring is how the administrator ensures via the management system that the application is behaving, configured, and installed per the model. It also includes ensuring expected functionality, the desired amount of security, performing properly, and delivery the data as expected for the users. Thus, monitoring crosses all of those domains.

The general process is to install, configure, run tasks on demand, consume events, provide instrumentation, configuration, and store data and results. The health manifest provides the working instructions to the monitoring system in the form of rules that are the instructions to the monitoring system. In general, the manifest contains the runtime instructions, and the runtime implements the desired state.

The monitoring service is both a local service, as well as a central or distributed mechanism. For a distributed implementation, health includes that of the local machine as well as the relationships between the local and remote machines. For example, given a cluster of ten machines, as long as six are functioning properly, the system is considered to be healthy. However, if no more than five machines are running, the system health status degrades to a cautionary state. If no more than four machines are running, the system health can be considered in a failure state. Hardware abstraction facilitates bringing one or more backup systems or applications/services online if one or more cluster machines fail or go offline. Thus, a pool of idle or shared resources can be controlled based upon instructions. This feature is particularly useful in a data center environment. Automated actions can be implemented to ensure that the system maintains optimum or at least a minimum functionality.

One aspect of the model-based management architecture allows a developer to author a large number of rules that express criteria that must be met for a system to be considered healthy. The monitoring API 784 includes a rules runtime engine that facilitates implicit concurrent processing of the rules. The rules engine receives input instructions that express the rules as an intermediate form, which rules are expressed using a rules definition language (RDL). The rules engine also receives configuration data from the configuration database 774 that is used to instantiate the rule code. A translator reads the input instructions and transforms them into a parallel execution form.

The runtime engine reads the translated instructions and facilitates parallel execution. The rule code is instantiated by loading the configuration data into the runtime engine that specifies which rules to run, as well as the parameters required to run the rule. Rule parameters can be changed at runtime, such as enabling rules that have a heavy system impact only when a problem has been detected. Thus, the rules are dynamic, as well as thresholds, that also can be changed accordingly. The monitoring API 784 also connects to all subcomponents of the system 510.

There is also provided a manifest storing and editing service 788 for use by the administrator. The manifest service 788 has associated therewith a protocol 789 and a viewer 790 to expose these manifest functions to the administrator. The manifest service 788 feeds the manifests to the administrator via the protocol 789 and viewer 790, allowing the administrator to view and change the manifests before installation. The manifest service 788 also facilitates versioning of the manifests according to updates and customizations.

There is also provided a role-based access API 791 that interfaces to all subcomponents of the model-based management system, and further has associated therewith a protocol 792 and a viewer 793. The protocol 792 facilitates communicating API-related data with other components of the system 510. The viewer 793 displays data related to the role-based API 791. This API 791 is illustrated at a level above the monitoring and configuration components to provide overall administration of access to the various components and aspects of the model-based management system. It is not necessary that the role-based access API 791 include the protocol 792 and a viewer 793, since these functions can be facilitated by other components of the system 510.

The system also includes the classifier 794 for machine-based learning and control. As indicated hereinabove, the classifier 794 can be employed in many ways to enhance system performance and health, to name just a few. To facilitate machine-based learning, the classifier 794 interfaces with central configuration service 776 such that all components of the system may be accessed and its data used.

Figure 7E:
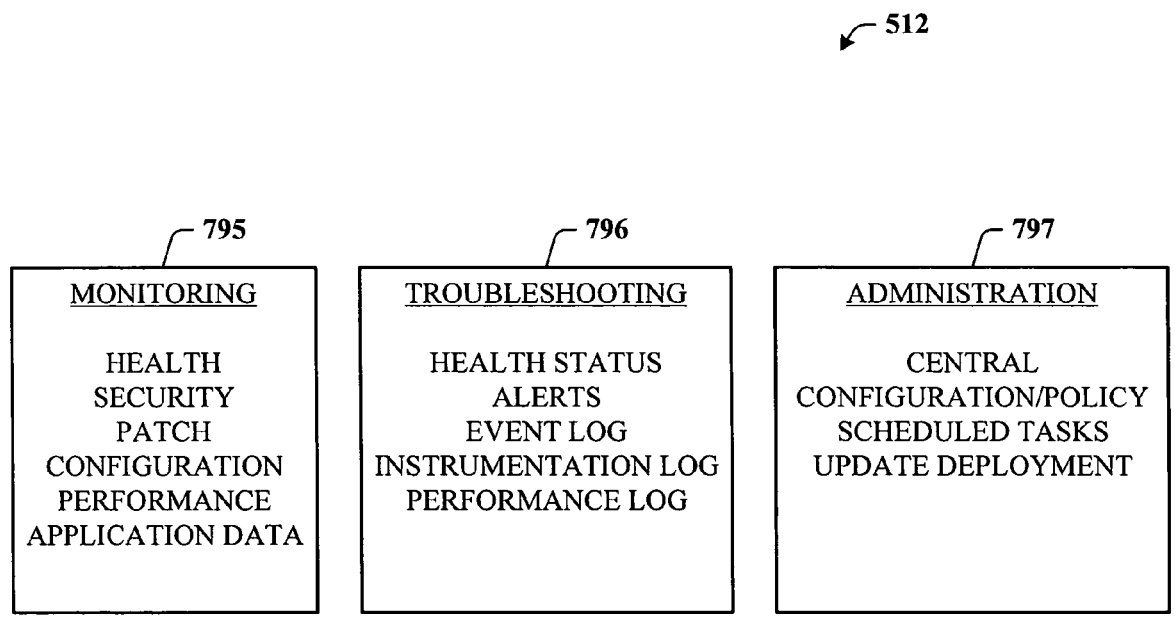
FIG. 7E illustrates principal subcomponents of the tasks component of the model-based management architecture.

Referring now to FIG. 7E, there is illustrated principal subcomponents of the tasks component 512 of the model-based management architecture. The tasks are described through the administration task model. The tasks fall into three subcomponents: a monitoring subcomponent 795, a troubleshooting subcomponent 796, and an administration subcomponent 797.

The tasks for the monitoring subcomponent 795 include overseeing health, security, patches, configuration, performance, and application data. The tasks for the troubleshooting subcomponent 796 include diagnosing a health state, processing alerts, and updating event, instrumentation, and performance logs. The tasks of the administration subcomponent 797 include central configuration/policy, scheduling, and update deployment. Administration includes not only management of a single system by also managing many machines, applications, and systems, policies, backup times, changes, and updates, for example.

URIs are employed in the model-based management architecture to uniquely identify abstract or physical resources or collections of resources. A schema for a resource can be identified by the URI with a placeholder for the resource. The URI with placeholder is called a URI template. The catalog of the system relies on URI templates to describe instrumentation without referring to specific instances. URI templates allow probes to be identified and their characteristics understood without actually retrieving the probe for a particular instance. Protecting the capability to predefine instrumentation separately from instances makes the deployment and authoring of rules easier and the associated operating system manageable.

The model-based management framework employs the RDL to enable defining of rules for the purpose of monitoring the availability of software and hardware. Rules written in RDL are executed by the runtime engine as part of the monitoring service. The purpose of the RDL is to test assertions, enforce constraints using runtime information, make inferences, perform correlation, and communicate results of dynamic tests to other components. The RDL defines the rule type (i.e., class) while a separate XML (eXtensible Markup Language) document is used to create instances of the rule type by specifying the parameter values necessary for its instantiation. There is a schema for describing the sequence of steps the system should take for problem detection, diagnosis, resolution, verification, and alerting. This is what is described in the model, expressed in the manifest, and executed/managed by the monitoring system.

The model-based management framework employs events and update values of performance counters to indicate a health model (or status) of services, and tests or synthetic transaction, as indicated earlier. The health model 701 is a graphical and/or textual representation of how a service or component may fail, which helps an administrator to understand the significance of various events and performance counters of the service, and efficiently decide whether to take any action based on the observed instrumentation data. A developer builds the health model 701 with the corresponding files then generated from the model and source code attribution.

The health model 701 includes a description of the component relationships, in addition to the dependencies. Depending upon the context of a detected problem, the system can walk the relationship tree and attempt to determine root cause based upon the health of other components. This approach is backed by the model and manifest.

Figure 8:
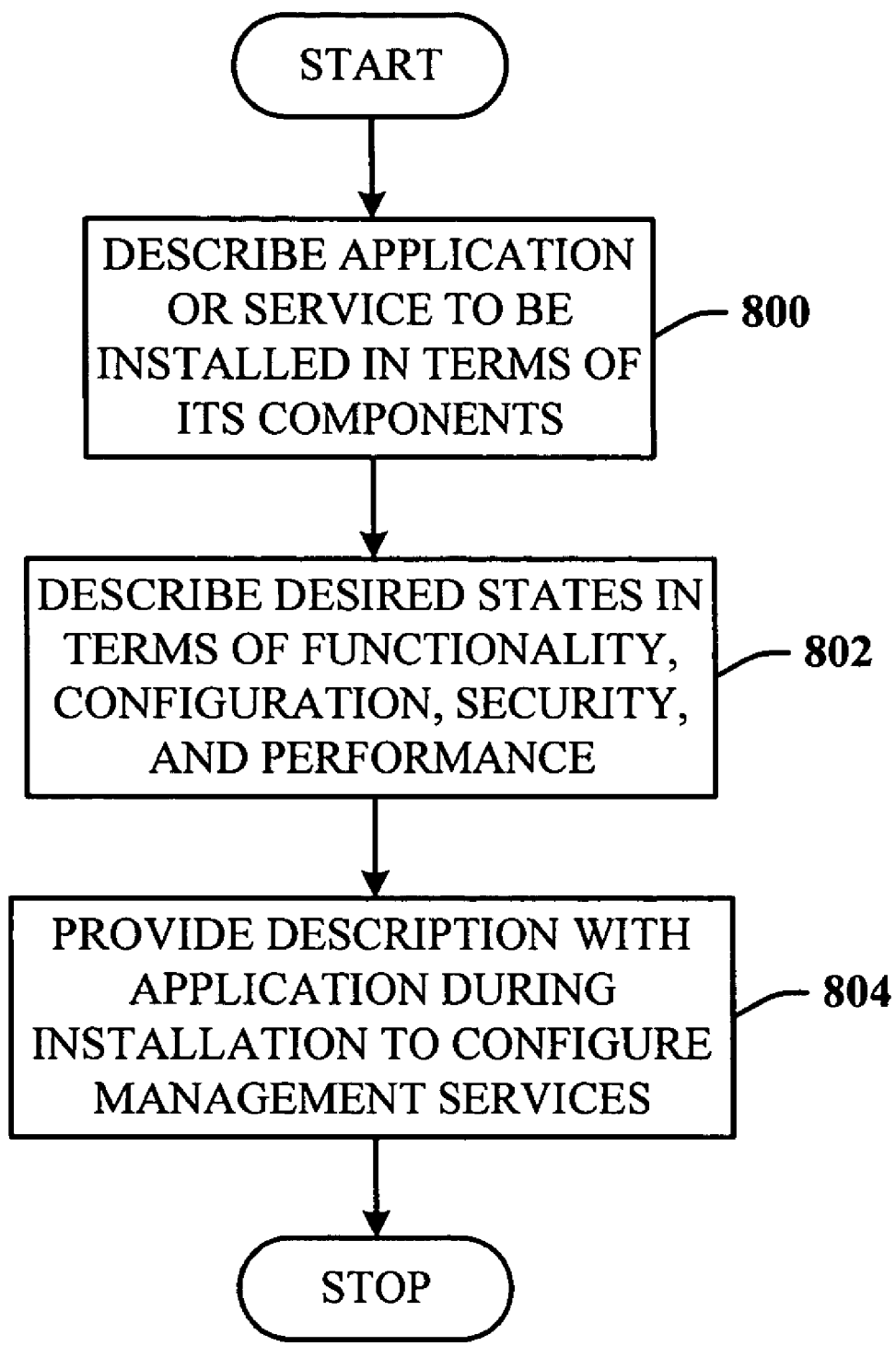
FIG. 8 illustrates a flow chart of a process of model-based management.

Referring now to FIG. 8, there is illustrated a flow chart of a process of model-based management. At 800, the application or service to be installed is described in terms of its components. At 802, the application or service is described in the desired states in terms of functionality, configuration, security, and performance. At 804, the description is provided along with the application or service during installation, such that the description is used by the system to configure management services of the system. The process then reaches a Stop block.

Figure 9:
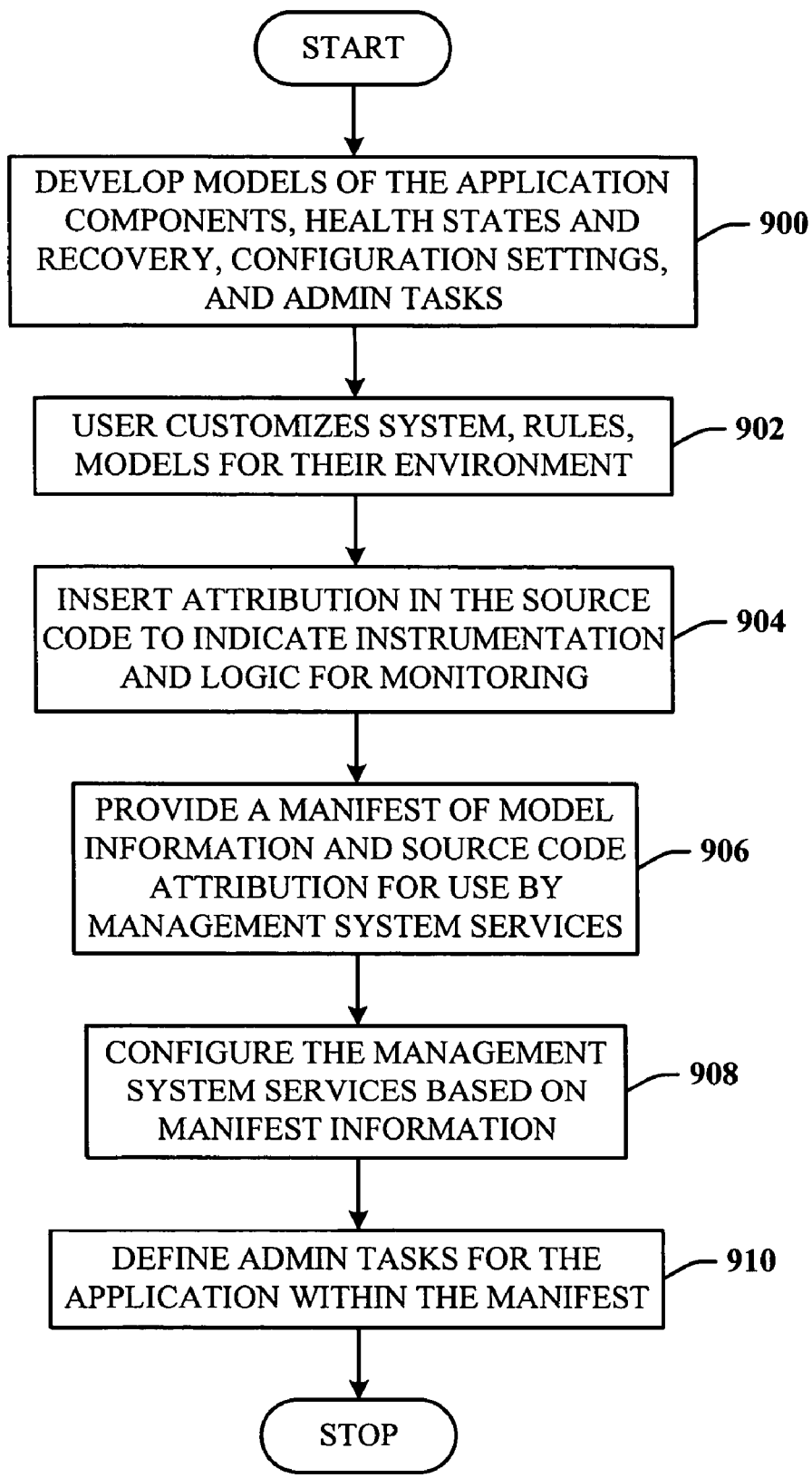
FIG. 9 illustrates a more detailed flow chart of a process of implementing the model-based management.

Referring now to FIG. 9, there is illustrated a more detailed flow chart of a process of implementing the model-based management. At 900, models are developed for the application components, health states and recovery, configuration settings, and admin tasks. At 902, a user customizes the system/rules/models according to the environment. At 904, attribution is inserted into the source code to indicate instrumentation and logic for monitoring. At 906, a manifest is provided of model information and source code attribution for use by the management system services. The manifest is provided for use by the management system services in machine-readable form. At 908, one or more of the management system services are configured based on the manifest information. At 910, administrative tasks are defined for the application within the manifest such as registering cmdlets with the system, setting up schedules, etc. The process then reaches a Stop block.

Figure 10:
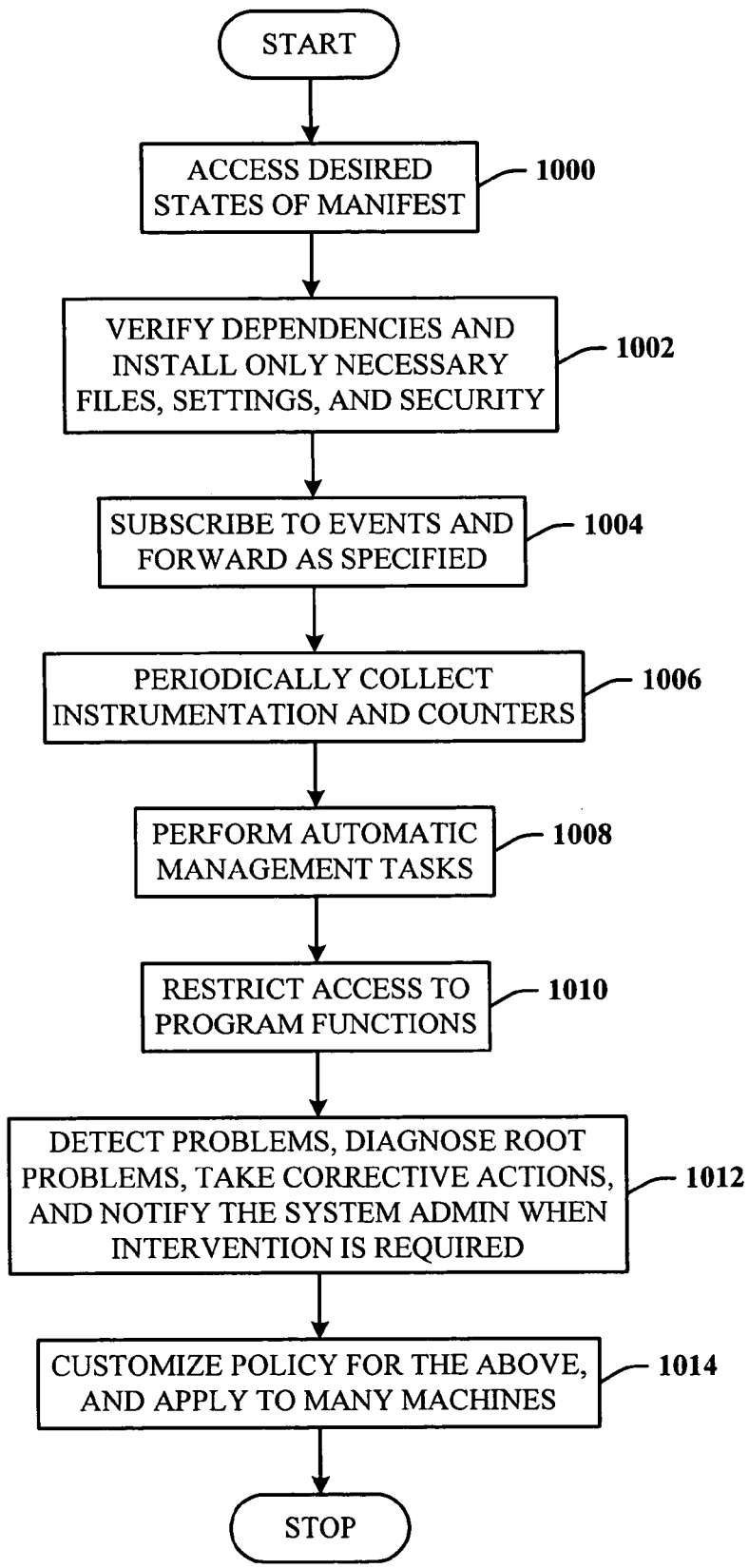
FIG. 10 illustrates a flow chart of a process of implementing desired states of the model-based management.

Referring now to FIG. 10, there is illustrated a flow chart of a process of implementing desired states of the model-based management. At 1000, the desired states are accessed from the manifest. At 1002, dependencies are verified and only the necessary files, settings, and security features are installed. At 1004, events are subscribed to and forwarded, as specified in the manifest. At 1006, instrumentation data and counter data is collected periodically, as well as tests and synthetic transactions performed. At 1008, automatic management tasks are performed. At 1010, access is restricted to program functions. However, this does not need to be included to facilitate model-based management. At 1012, problems are detected, root problems diagnosed, corrective actions taken, and the system administrator notified when to intervene. At 1014, policies for all of the above are customized for application to many other types of machines and systems. The process then reaches a Stop block.

Figure 11:
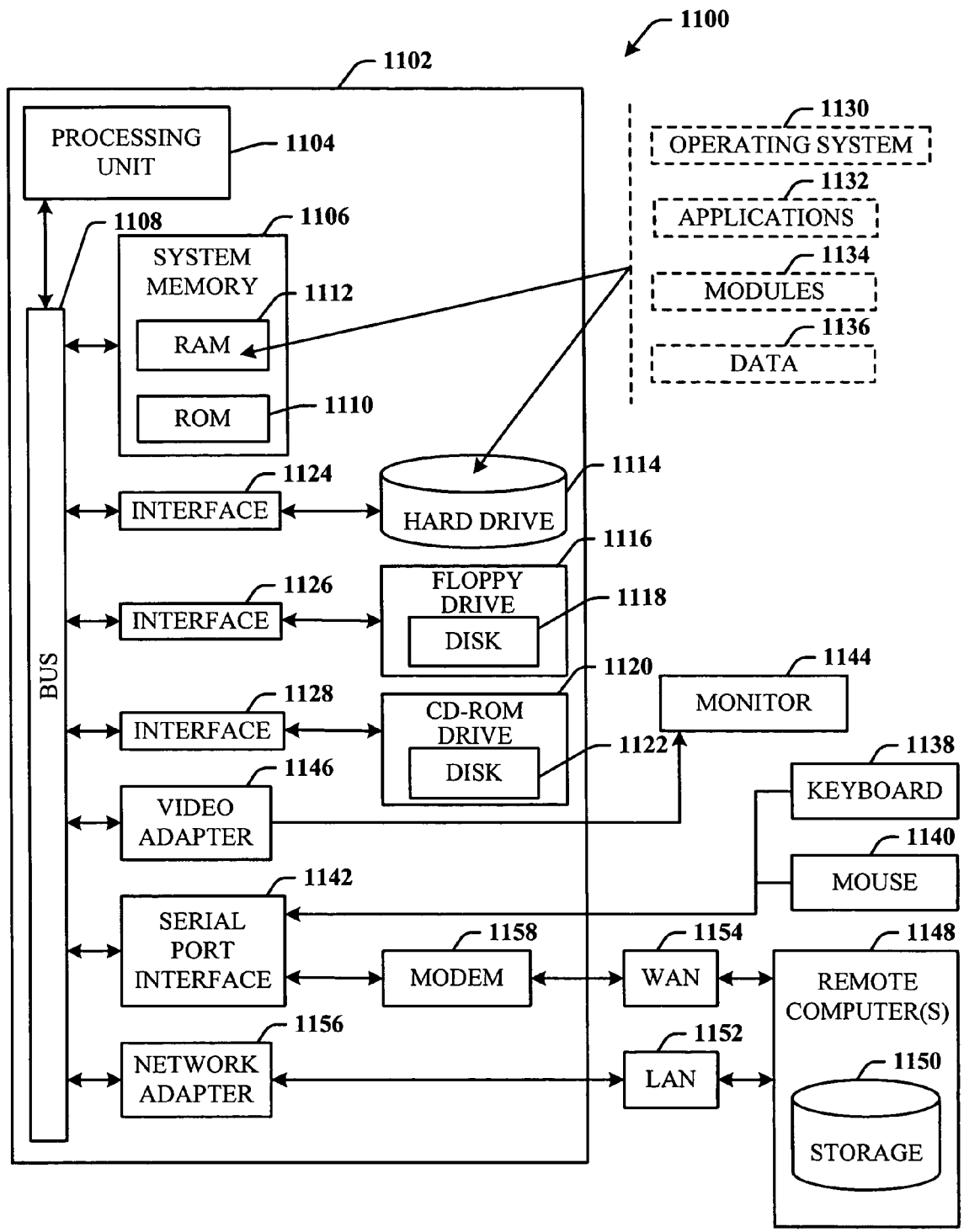
FIG. 11 illustrates a block diagram of a computer operable to execute the disclosed architecture.

Referring now to FIG. 11, there is illustrated a block diagram of a computer operable to execute the disclosed architecture. In order to provide additional context for various aspects of the present invention, FIG. 11 and the following discussion are intended to provide a brief, general description of a suitable computing environment 1100 in which the various aspects of the present invention may be implemented. While the invention has been described above in the general context of computer-executable instructions that may run on one or more computers, those skilled in the art will recognize that the invention also may be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods may be practiced with other computer system configurations, including single-processor or multiprocessor computer systems, minicomputers, mainframe computers, as well as personal computers, hand-held computing devices, microprocessor-based or programmable consumer electronics, and the like, each of which may be operatively coupled to one or more associated devices. The illustrated aspects of the invention may also be practiced in distributed computing environments where certain tasks are performed by remote processing devices that are linked through a communications network. In a distributed computing environment, program modules may be located in both local and remote memory storage devices.

With reference again to FIG. 11, there is illustrated an exemplary environment 1100 for implementing various aspects of the invention that includes a computer 1102, the computer 1102 including a processing unit 1104, a system memory 1106 and a system bus 1108. The system bus 1108 couples system components including, but not limited to, the system memory 1106 to the processing unit 1104. The processing unit 1104 may be any of various commercially available processors. Dual microprocessors and other multi-processor architectures may also be employed as the processing unit 1104.

The system bus 1108 can be any of several types of bus structure that may further interconnect to a memory bus (with or without a memory controller), a peripheral bus, and a local bus using any of a variety of commercially available bus architectures. The system memory 1106 includes read only memory (ROM) 1110 and random access memory (RAM) 1112. A basic input/output system (BIOS) is stored in a non-volatile memory 1110 such as ROM, EPROM, EEPROM, which BIOS contains the basic routines that help to transfer information between elements within the computer 1102, such as during start-up. The RAM 1112 can also include a high-speed RAM such as static RAM for caching data.

The computer 1102 further includes a hard disk drive 1114, a magnetic disk drive 1116, (e.g., to read from or write to a removable disk 1118) and an optical disk drive 1120, (e.g., reading a CD-ROM disk 1122 or to read from or write to other high capacity optical media such as Digital Video Disk (DVD)). The hard disk drive 1114, magnetic disk drive 1116 and optical disk drive 1120 can be connected to the system bus 1108 by a hard disk drive interface 1124, a magnetic disk drive interface 1126 and an optical drive interface 1128, respectively. The drives and their associated computer-readable media provide nonvolatile storage of data, data structures, computer-executable instructions, and so forth.

For the computer 1102, the drives and media accommodate the storage of broadcast programming in a suitable digital format. Although the description of computer-readable media above refers to a hard disk, a removable magnetic disk and a CD, it should be appreciated by those skilled in the art that other types of media which are readable by a computer, such as zip drives, magnetic cassettes, flash memory cards, digital video disks, cartridges, and the like, may also be used in the exemplary operating environment, and further that any such media may contain computer-executable instructions for performing the methods of the present invention.

A number of program modules can be stored in the drives and RAM 1112, including an operating system 1130, one or more application programs 1132, other program modules 1134 and program data 1136. All or portions of the operating system, applications, modules, and/or data can also be cached in the RAM 1112. It is appreciated that the present invention can be implemented with various commercially available operating systems or combinations of operating systems.

A user can enter commands and information into the computer 1102 through a keyboard 1138 and a pointing device, such as a mouse 1140. Other input devices (not shown) may include a microphone, an IR remote control, a joystick, a game pad, a satellite dish, a scanner, or the like. These and other input devices are often connected to the processing unit 1104 through a serial port interface 1142 that is coupled to the system bus 1108, but may be connected by other interfaces, such as a parallel port, a game port, a universal serial bus ("USB"), an IR interface, etc. A monitor 1144 or other type of display device is also connected to the system bus 1108 via an interface, such as a video adapter 1146. In addition to the monitor 1144, a computer typically includes other peripheral output devices (not shown), such as speakers, printers, etc.

The computer 1102 may operate in a networked environment using logical connections via wired and/or wireless communications to one or more remote computers, such as a remote computer(s) 1148. The remote computer(s) 1148 may be a workstation, a server computer, a router, a personal computer, portable computer, microprocessor-based entertainment appliance, a peer device or other common network node, and typically includes many or all of the elements described relative to the computer 1102, although, for purposes of brevity, only a memory storage device 1150 is illustrated. The logical connections depicted include a local area network (LAN) 1152 and a wide area network (WAN) 1154. Such networking environments are commonplace in offices, enterprise-wide computer networks, intranets and the Internet.

When used in a LAN networking environment, the computer 1102 is connected to the local network 1152 through a wired or wireless communication network interface or adapter 1156. The adaptor 1156 may facilitate wired or wireless communication to the LAN 1152, which may also include a wireless access point disposed thereon for communicating with the wireless adaptor 1156.

When used in a WAN networking environment, the computer 1102 typically includes a modem 1158, or is connected to a communications server on the LAN, or has other means for establishing communications over the WAN 1154, such as the Internet. The modem 1158, which may be internal or external and a wired or wireless device, is connected to the system bus 1108 via the serial port interface 1142. In a networked environment, program modules depicted relative to the computer 1102, or portions thereof, may be stored in the remote memory storage device 1150. It will be appreciated that the network connections shown are exemplary and other means of establishing a communications link between the computers may be used.

The computer 1102 is operable to communicate with any wireless devices or entities operably disposed in wireless communication, e.g., a printer, scanner, desktop and/or portable computer, portable data assistant, any piece of equipment or location associated with a wirelessly detectable tag (e.g., a kiosk, news stand, restroom), and telephone. This includes at least Wi-Fi and Bluetooth™ wireless technologies. Thus, the communication may be a predefined structure as with conventional network or simply an ad hoc communication between at least two devices.

Wi-Fi, or Wireless Fidelity, allows connection to the Internet from a couch home, a bed in a hotel room or a conference room at work, for example, without wires. Wi-Fi is a wireless technology used in a cellular network that enables such devices (e.g., computers and cell phones) to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, with an 11 Mbps (802.11a) or 54 Mbps (802.11b) data rate or with products that contain both bands (dual band), so the networks can provide real-world performance similar to the basic 10BaseT wired Ethernet networks used in many offices.

Figure 12:
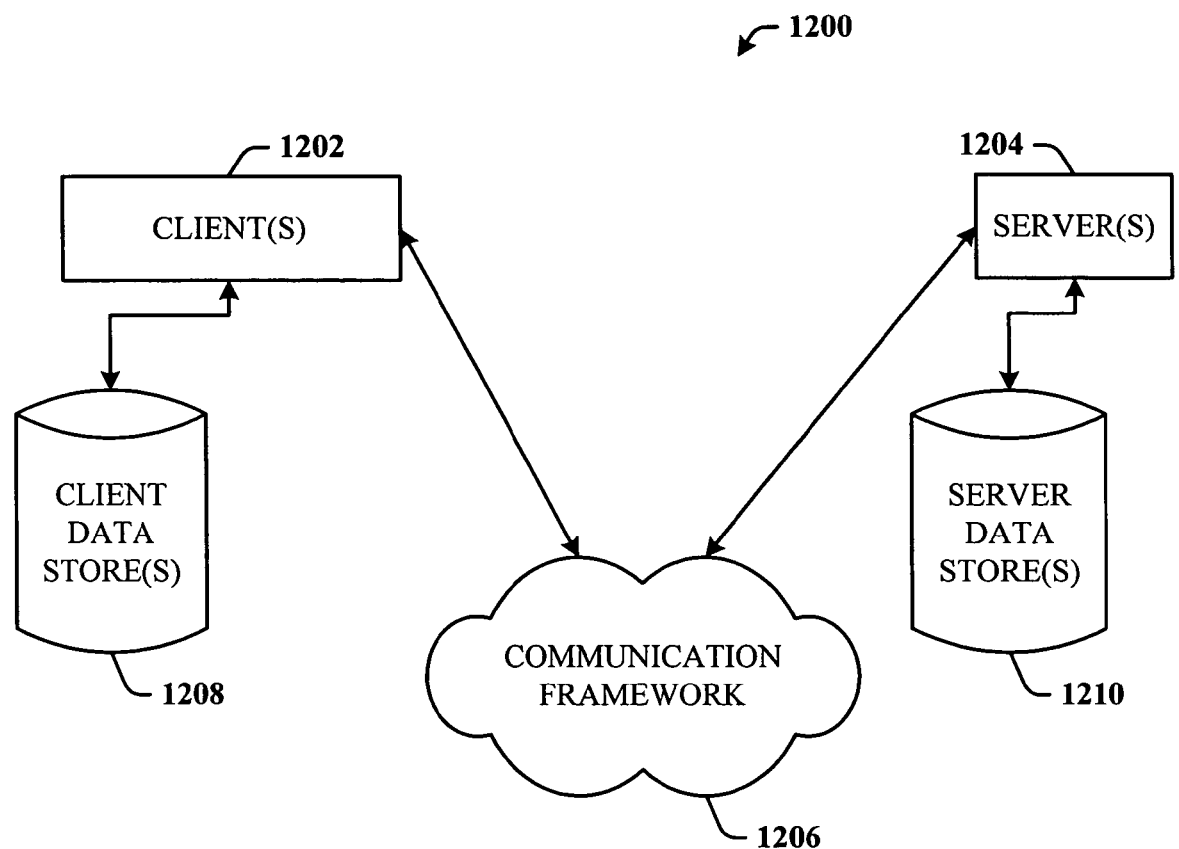
FIG. 12 illustrates a schematic block diagram of an exemplary computing environment in accordance with the present invention.

Referring now to FIG. 12, there is illustrated a schematic block diagram of an exemplary computing environment 1200 in accordance with the present invention. The system 1200 includes one or more client(s) 1202. The client(s) 1202 can be hardware and/or software (e.g., threads, processes, computing devices). The client(s) 1202 can house cookie(s) and/or associated contextual information by employing the present invention, for example.

The system 1200 also includes one or more server(s) 1204. The server(s) 1204 can also be hardware and/or software (e.g., threads, processes, computing devices). The servers 1204 can house threads to perform transformations by employing the present invention, for example. One possible communication between a client 1202 and a server 1204 may be in the form of a data packet adapted to be transmitted between two or more computer processes. The data packet may include a cookie and/or associated contextual information, for example. The system 1200 includes a communication framework 1206 (e.g., a global communication network such as the Internet) that can be employed to facilitate communications between the client(s) 1202 and the server(s) 1204.

Communications may be facilitated via a wired (including optical fiber) and/or wireless technology. The client(s) 1202 are operably connected to one or more client data store(s) 1208 that can be employed to store information local to the client(s) 1202 (e.g., cookie(s) and/or associated contextual information). Similarly, the server(s) 1204 are operably connected to one or more server data store(s) 1210 that can be employed to store information local to the servers 1204.

As indicated hereinabove, the disclosed model-based management architecture has application to enterprise-type system management. For example, one of the clients 1202 can manage not only local applications or services, but also those of remote nodes, for example, the servers 1204. All aspects apply to support health monitoring from a single instance of the local client to multiple instances across remote systems and applications of multiple network nodes. Machine-based learning can be employed from the local level to the enterprise level and beyond, to automate and improve system performance and capabilities.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method for managing an application or service, including determining or correcting heath of the application or service, the method comprising:

installing application code of an application or service on a computing system;

when installation of the application code is performed, sweeping the application code for markers inserted by a developer of the application or service, wherein the markers denote probes;

for each marker in the application code, copying information into a manifest as management information, wherein the management information copied into the manifest includes:

a specific identification of one or more portions of the application code that are a subset of the application code and that were identified by the developer as portions of the application code used to at least one of determine or correct health of the application or service; and one or more monitoring rules, wherein the monitoring rules specifically identify when to execute the portions of the application code used to determine or correct health of the application or service;

storing the manifest in the catalog, wherein the catalog stores a plurality of different manifests associated with different applications or services; and at runtime of the application code of the application or service, determining that at least one of the one or more monitoring rules is satisfied and, in response:

consulting the catalog and identifying the manifest for the application or service from among the plurality of different manifests associated with different applications or services;

identifying, within the manifest corresponding to the application or service, management information identifying the subset of the application code used to determine or correct health of the application; and performing runtime execution of the subset of the application code used to determine or correct health of the application or service.

2. The method of claim 1, wherein the management information copied into the manifest and specifically identifying one or more portions of the application code that are used to determine or correct health of the application includes a uniform resource identifier (URI), and wherein identifying the subset of the application code used to determine or correct health of the application includes identifying the URI.

3. The method of claim 1, wherein sweeping the application code is performed during an authoring phase, and executing the subset of the application code is performed at a runtime phase.

4. The method of claim 1, further comprising generating the manifest before storing the manifest in the catalog.

5. The method of claim 4, wherein the application code defines an internal state component providing internal state data also used to generate the manifest.

6. The method of claim 1, wherein the markers are attribution data, and further include configurable additional operations to be performed, as well as runtime states that are in addition to health data.

7. The method of claim 1, wherein runtime execution of the subset of the application code is performed by a web host accessing the management information at runtime by utilizing an application programming interface (API) dynamic link library (DLL), and wherein the management information is stored remote from the web host.

8. The method of claim 1, wherein the catalog is accessible from a remote host.

9. The method of claim 1, wherein the catalog is remote from an location where the at least one of the application or service is installed.

10. One or more computer readable media having stored thereon computer executable instructions that, when executed by a processor of a computing system, perform a method for managing an application or service, including determining or correcting heath of the application or service, the method comprising:

installing application code of an application or service on a computing system;

when installation of the application code is performed, sweeping the application code for markers inserted by a developer of the application or service, wherein the markers denote probes;

for each marker in the application code, copying information into a manifest as management information, wherein the management information copied into the manifest includes:
  a specific identification of one or more portions of the application code that are a subset of the application code and that were identified by the developer as portions of the application code used to at least one of determine or correct health of the application or service; and
  one or more monitoring rules, wherein the monitoring rules specifically identify when to execute the portions of the application code used to determine or correct health of the application or service;
storing the manifest in the catalog, wherein the catalog stores a plurality of different manifests associated with different applications or services; and
at runtime of the application code of the application or service, determining that at least one of the one or more monitoring rules is satisfied and, in response:
  consulting the catalog and identifying the manifest for the application or service from among the plurality of different manifests associated with different applications or services;
  identifying, within the manifest corresponding to the application or service, management information identifying the subset of the application code used to determine or correct health of the application; and
  performing runtime execution of the subset of the application code used to determine or correct health of the application or service.

11. The one or more computer readable media of claim 10, wherein the management information copied into the manifest and specifically identifying one or more portions of the application code that are used to determine or correct health of the application includes a uniform resource identifier (URI), and wherein identifying the subset of the application code used to determine or correct health of the application includes identifying the URI.

12. The one or more computer readable media of claim 10, wherein sweeping the application code is performed during an authoring phase, and executing the subset of the application code is performed at a runtime phase.

13. The one or more computer readable media of claim 10, wherein the method further comprises generating the manifest before storing the manifest in the catalog.

14. The one or more computer readable media of claim 13, wherein the application code defines an internal state component providing internal state data also used to generate the manifest.

15. The one or more computer readable media of claim 10, wherein the markers are attribution data, and further include configurable additional operations to be performed, as well as runtime states that are in addition to health data.

16. The one or more computer readable media of claim 10, wherein runtime execution of the subset of the application code is performed by a web host accessing the management information at runtime by utilizing an application programming interface (API) dynamic link library (DLL), and wherein the management information is stored remote from the web host.

17. The one or more computer readable media of claim 10, wherein the catalog is accessible from a remote host.

18. The one or more computer readable media of claim 10, wherein the catalog is remote from an location where the at least one of the application or service is installed.

19. A method for managing an application or service, including determining or correcting heath of the application or service, the method comprising:
  installing application code of an application or service on a computing system;
  when installation of the application code is performed, sweeping the application code for markers inserted by a developer of the application or service, wherein the markers denote probes;
  for each marker in the application code, generating a first manifest and copying information into the first manifest as management information, wherein generating the first manifest comprises prompting an administrator to choose between accepting default values and customizing the first manifest, and wherein the management information copied into the first manifest includes:
    a specific identification of one or more portions of the application code that are a subset of the application code and that were identified by the developer as portions of the application code used to at least one of determine or correct health of the application or service, wherein the specific identification is in the form of a uniform resource identifier (URI) having an administrator namespace and different than internal development names, and wherein health of the application or service comprises information related to each of failure states of the application or service and detecting failure states of the application or service; and
    one or more monitoring rules, wherein the monitoring rules specifically identify when to execute the portions of the application code used to determine or correct health of the application or service; and
  storing the first manifest in the catalog, wherein the catalog stores a plurality of different manifests associated with different applications or services;
  at runtime of the application code of the application or service, determining that at least one of the one or more monitoring rules is satisfied and, in response:
    consulting the catalog and identifying the first manifest for the application or service from among the plurality of different manifests associated with different applications or services;
    identifying, within the first manifest corresponding to the application or service, URI's as management information identifying the subset of the application code used to determine or correct health of the application; and
    using the identified URI's to perform runtime execution of the subset of the application code used to determine or correct health of the application or service;
  for a classic provider that cannot be scanned for attribution of management information, accessing an adaptor through a host dynamic link library (DLL), the adapter providing access to health of the classic provider through a common object model (COM) link, and the health information being provided via a managed object format;
  converting the health information in the managed object format into a second manifest for the classic provider;
  storing the second manifest in the catalog;
  in a validation mode generating a third manifest corresponding to the application or service and comparing the third manifest to the first manifest, wherein comparing the first and third manifests comprises reporting any differences between the first and third manifests, and merging the first and third manifests; and
  storing the merged first and third manifests in the catalog.

* * * * *